(12) United States Patent
Kubota et al.

(10) Patent No.: US 8,508,648 B2
(45) Date of Patent: Aug. 13, 2013

(54) IMAGING LENS

(75) Inventors: Yoji Kubota, Nagano (JP); Kenichi Kubota, Nagano (JP); Hitoshi Hirano, Nagano (JP); Ichiro Kurihara, Tochigi (JP); Yoshio Ise, Tochigi (JP); Sumio Fukuda, Tochigi (JP)

(73) Assignees: Optical Logic Inc., Nagano (JP); Kantatsu Co., Ltd., Tochigi (JP)

( * ) Notice: Subject to any disclaimer, the term of this patent is extended or adjusted under 35 U.S.C. 154(b) by 66 days.

(21) Appl. No.: 13/206,136

(22) Filed: Aug. 9, 2011

(65) Prior Publication Data

US 2012/0044404 A1  Feb. 23, 2012

(30) Foreign Application Priority Data

Aug. 23, 2010  (JP) ................. 2010-185703

(51) Int. Cl.
  *H04N 5/225* (2006.01)
  *G02B 3/02* (2006.01)
  *G02B 9/34* (2006.01)
(52) U.S. Cl.
  USPC ................ 348/340; 359/715; 359/772
(58) Field of Classification Search
  USPC .............. 348/340; 359/715, 772, 773, 774
  See application file for complete search history.

(56) References Cited

U.S. PATENT DOCUMENTS

| 7,277,238 | B2 | 10/2007 | Noda |
| 8,179,470 | B2 * | 5/2012 | Chen et al. .................. 348/335 |
| 2011/0115962 | A1 | 5/2011 | Chen et al. |

FOREIGN PATENT DOCUMENTS

| JP | 2008-107616 A | 5/2008 |
| JP | 2009-020182 | 1/2009 |

* cited by examiner

*Primary Examiner* — David N Spector
(74) *Attorney, Agent, or Firm* — Kubotera & Associates LLC

(57) ABSTRACT

An imaging lens includes an aperture stop ST, a first lens L1 that is shaped to form a meniscus lens that directs a convex surface to the object side near an optical axis and has positive refractive power, a second lens L2 that is shaped to form a meniscus lens that directs a convex surface to the object side near the optical axis and has negative refractive power, a third lens L3 that is shaped to form a meniscus lens that directs a concave surface to the object side near the optical axis and has positive refractive power, and a fourth lens L4 that is shaped to form a meniscus lens that directs a convex surface to the object side near the optical axis, arranged in this order from an object side to an image side. When the first lens L1 has a focal length f1 and the second lens L2 has a focal length f2, the imaging lens is configured such that a relationship $0.3<|f1/f2|<0.7$ is satisfied.

18 Claims, 18 Drawing Sheets

IMAGING LENS

BACKGROUND OF THE INVENTION AND RELATED ART STATEMENT

The present invention relates to an imaging lens for forming an image on an imaging element such as a CCD sensor and a CMOS sensor. In particular, the present invention relates to an imaging lens suitable for mounting in a relatively small camera such as a cellular phone, a digital still camera, a portable information terminal, a security camera, an onboard camera, and a network camera.

In these years, most cellular phone models include an onboard camera as standard equipment, and there have been attempts to increase added values of cellular phones. Furthermore, there are progresses in integrating a digital still camera to a cellular phone every year, and in these days, there have been available cellular phones, which have optical performances and various functions that are comparable to those of digital still cameras.

An imaging lens to be mounted in such cellular phone is strongly required to have sufficient optical performances suitable for resolution of an imaging element and a small size. Conventionally, both sufficient optical performances and small size have been attained by an imaging lens with a two-lens configuration or a three-lens configuration. However, optical performances on demands are higher and higher every year as an imaging element has higher resolution, and it is impossible to sufficiently correct aberrations by such two-lens or three-lens configuration, so that it is difficult to fully satisfy the demanded optical performances.

For this reason, there are studies on adding another lens, i.e., a lens configuration of four lenses. For example, an imaging lens disclosed in Patent Reference includes a first lens that is positive and has a convex surface on the both sides; a second lens that is negative and has a shape of meniscus lens directing a convex surface to the object side; a third lens that is positive and has a shape of meniscus lens directing a concave surface to the object side; and a fourth lens that is negative and has a concave surface on the both sides arranged in this order from an object side. The configuration attains good optical performances while restraining increase of total length of the imaging lens by setting preferable range for a ratio between a focal length of the fourth lens and a focal length of the whole lens system and keeping the ratio within the range.

Patent Reference: Japanese Patent Application Publication No. 2009-20182

According to the imaging lens of Patent Reference, it is possible to obtain relatively good aberrations. However, miniaturization and functions of cellular phones are advanced every year, and cellular phones themselves are increasingly required to have a smaller size and higher functions. In the lens configuration disclosed in Patent Reference, it is difficult to attain both miniaturization and good aberration correction to satisfy those demands.

Furthermore, cameras mounted in cellular phones are used in various ways, and for example, those cameras are widely used to take picture of himself/herself with his/her friend(s) while holding his/her cellular phone with his/her hand, take picture of himself/herself with landscape as the background, etc. Since a person who takes a picture himself/herself is an object to take a photo in those uses, imaging lenses of cameras mounted in cellular phones are required to have enlarged imaging angle of view, i.e. wide angle of view.

Here, attaining both miniaturization and good aberration correction and wider angle is not specific issues to imaging lenses mounted in the cellular phones and is a common issue even in imaging lenses mounted in relatively small cameras such as digital still cameras, portable information terminals, security cameras, onboard cameras, and network cameras.

In view of the problems of the conventional techniques described above, an object of the present invention is to provide an imaging lens that has a small size, is capable of properly correcting aberration and has relatively wide imaging angle of view.

SUMMARY OF THE INVENTION

In order to attain the object described above, according to the present invention, an imaging lens includes a first lens having positive refractive power; a second lens having negative refractive power; a third lens having positive refractive power; and a fourth lens arranged in an order from an object side to an image side. The first lens is formed in a shape so that both a curvature radius of a surface thereof on the object side and a curvature radius of a surface thereof on the image side are positive. The second lens is formed in a shape so that both a curvature radius of a surface thereof on the object side and a curvature radius of a surface thereof on the image side are positive. The third lens is formed in a shape so that both a curvature radius of a surface thereof on the object side and a curvature radius of a surface thereof on the image side are negative. The fourth lens is formed in a shape so that both a curvature radius of a surface thereof on the object side and a curvature radius of a surface thereof on the image side are positive. In addition, the first lens has stronger refractive power than the second lens, the third lens, and the fourth lens, and the fourth lens has weaker refractive power than the first lens, the second lens, and the third lens. Furthermore, when the first lens has a focal length f1 and the second lens has a focal length f2, the imaging lens is configured to satisfy the following conditional expression (1):

$$0.3 < |f1/f2| < 0.7 \qquad (1)$$

According to the invention, since the first lens has stronger refractive power than the second lens, the third lens, and the fourth lens, it is possible to suitably attain miniaturization of the imaging lens. Furthermore, when the imaging lens with the configuration described above satisfies the conditional expression (1), it is possible to restrain the chromatic aberration, spherical aberration, and coma aberration respectively within suitable range while attaining miniaturization and wide angle of view of the imaging lens. In the conditional expression (1), when the value exceeds the upper limit "0.7", the first lens has refractive power relatively stronger than that of the second lens and the off-axis chromatic aberration of magnification is excessively corrected (that of a short wavelength increases in a plus direction in relative to that of a reference wavelength). In addition, the coma aberration increases for an off-axis light beam. Therefore, it is difficult to obtain satisfactory imaging performance. Moreover, for correcting those aberrations, the total length of the lens system is long and thereby it is difficult to reduce the size of the imaging lens. On the other hand, when the value is below the lower limit "0.3", since the second lens has refractive power relatively weaker than that of the first lens, the axial chromatic aberration and the off-axis chromatic aberration of magnification are insufficiently corrected (that of a short wavelength increases in a minus direction in relative to that of a reference wavelength) although it is advantageous for reducing the size of the imaging lens. Therefore, it is also difficult in this case to obtain satisfactory image forming performance.

When the whole lens system has a focal length f and a composite focal length of the first lens and the second lens is f12, in the imaging lens with the above configuration, it is preferred to satisfy the following conditional expression (2):

$$1.5 < f12/f < 2.5 \tag{2}$$

When the above conditional expression (2) is satisfied, it is possible to restrain the axial chromatic aberration within satisfactory range while reducing the size of the imaging lens. When the value exceeds the upper limit "2.5", composite refractive power of the first lens and the second lens is relatively weaker than that of the whole lens system, and it is difficult to reduce the size of the imaging lens. On the other hand, when the value is below the lower limit "1.5", the composite refractive power of the first lens and the second lens is stronger than that of the whole lens system, so that the axial chromatic aberration is insufficiently corrected and it is difficult to obtain satisfactory imaging performance, although it is advantageous for reducing the size of the imaging lens.

When the whole lens system has a focal length f and the composite focal length of the second lens and the third lens is f23, in the imaging lens with the above-described configuration, it is preferred to satisfy the following conditional expression (3):

$$1.5 < f23/f < 9.0 \tag{3}$$

When the above expression (3) is satisfied, it is possible to restrain the field curvature within satisfactory range while reducing the size of the imaging lens. When the value exceeds the upper limit "9.0", the off-axis best image surface significantly tilts in a minus direction (on the object side) in relative to the axial best image surface and it is difficult to obtain a flat image surface and it is difficult to reduce the size of the imaging lens. On the other hand, when the value is below the lower limit "1.5", since the composite refractive power of the second lens and the third lens is relatively stronger than that of the whole lens system, although it is advantageous for reducing the size of the imaging lens, the off-axis best image surface significantly tilts in a plus direction (on the image side) in relative to the axial best image surface, it is also difficult in this case to obtain a flat image surface. Therefore, in either case, it is difficult to obtain satisfactory imaging performance.

In addition, in the imaging lens with the configuration described above, it is preferred to further satisfy the following conditional expression (3A):

$$1.5 < f23/f < 6.5 \tag{3A}$$

When the above expression (3A) is satisfied, it is possible to restrain the field curvature within more preferred range while suitably reducing the size of the imaging lens.

In the imaging lens with configuration described above, when the composite focal length of the first lens and the second lens is f12 and the composite focal length of the second lens and the third lens is f23, it is preferred to satisfy the following conditional expression (4):

$$0.2 < f12/f23 < 1.0 \tag{4}$$

When the conditional expression (4) is satisfied, it is possible to restrain the off-axis coma aberration, chromatic aberration, and field curvature respectively within satisfactory range. When the value exceeds the upper limit "1.0", the image surface significantly tilts in a plus direction (on the image side) and the chromatic aberration of magnification is insufficiently corrected. In addition, the off-axis coma aberration also increases, so that it is difficult to obtain satisfactory imaging performance. On the other hand, when the value is below the lower limit "0.2", since the image surface significantly tilts in the minus direction (on the object side), it is also difficult in this case to obtain satisfactory imaging performance.

In the imaging lens with configuration described above, when the surface of the first lens on the object side has curvature radius R1f and the surface of the first lens on the image side has curvature radius R1r, it is preferred to satisfy the following conditional expression (5):

$$0.05 < R1f/R1r < 0.25 \tag{5}$$

When the conditional expression (5) is satisfied, it is possible to restrain the off-axis aberration within satisfactory range while reducing the size of the imaging lens. When the value exceeds the upper limit "0.25", although it is advantageous for reducing the size of the imaging lens, an inward coma aberration is generated for an off-axis light beam and it is difficult to obtain satisfactory imaging performance. On the other hand, when the value is below the lower limit "0.05", an outward coma aberration is generated for an off-axis light beam and astigmatic difference increases, and it is difficult also in this case to obtain satisfactory imaging performance.

In the imaging lens with configuration described above, when the surface of the first lens on the image side has curvature radius R1r and the surface of the second lens on the object side has curvature radius R2f, it is preferred to satisfy the following conditional expression (6):

$$0.1 < R2f/R1r < 0.7 \tag{6}$$

When the conditional expression (6) is satisfied, it is possible to restrain the off-axis aberration within satisfactory range. When the value exceeds the upper limit "0.7", an inward coma aberration is generated for an off-axis light beam and sagittal image surface of the astigmatisms significantly tilts in a minus direction. Therefore, the astigmatic difference increases and it is difficult to obtain satisfactory imaging performance. On the other hand, when the value is below the lower limit "0.1", an outward coma aberration is generated for an off-axis light beam and the sagittal image surface of the astigmatisms significantly tilts in a plus direction. Therefore, the astigmatic difference also increases in this case and it is difficult to obtain satisfactory imaging performance.

In the invention, when an aperture stop is arranged on the object side of the first lens and the aperture stop has an aperture diameter D, it is preferred to satisfy the following conditional expression (7):

$$1.5 < f/D < 2.8 \tag{7}$$

As described above, imaging elements have higher and higher resolution in these years and the imaging lenses are required to have even higher optical performances than those in conventional ones. Among them, imaging lenses are significantly required to have brightness, i.e., a small F number. As well known, with advancement of imaging elements with higher resolution, pitches of pixels that compose an imaging element tend to be narrower. For example, while a pixel pitch is 1.4 µm in case of a ¼ inch imaging element having 5 mega pixels, a pixel pitch is as narrow as 1.1 µm in case of an imaging element that has the same ¼ size and has 8 mega pixels. Generally speaking, when a pixel pitch is narrower, a light-receiving area of each pixel decreases, so that a resultant image obtained through the imaging element is darker than that obtained through a conventional one. For this reason, as one of methods to solve those problems, there are attempts to decrease an F number of an imaging lens.

When the conditional expression (7) is satisfied, it is possible to decrease the F number while reducing the size of the imaging lens. When the value exceeds the upper limit "2.8", since the aperture diameter is small for the focal length of the whole lens system, although it is advantageous for reducing the size of the imaging lens, brightness is insufficient for a high-resolution imaging element. On the other hand, when the value is below the lower limit "1.5", since the aperture diameter is large for the focal length of the whole lens system, it is possible to further decrease the F number of the imaging lens and configure an imaging lens with brightness suitable for a high-resolution imaging element, but it is difficult to reduce the size of the imaging lens.

In the imaging lens with configuration described above, it is further preferred to satisfy the following conditional expression (7A):

$$1.8 < f/D < 2.6 \tag{7A}$$

In addition, in the imaging lens of the invention, so as to restrain the axis chromatic aberration and the off-axis chromatic aberration within satisfactory range, when the first lens has Abbe's number vd1 for a d line, the second lens has Abbe's number vd2 for a d line, the third lens has Abbe's number vd3 for a d line, and the fourth lens has Abbe's number vd4 for a d line, it is preferred to satisfy each of the following conditional expressions:

$$vd1 > 50$$

$$vd2 < 35$$

$$vd3 > 50$$

$$vd4 > 50$$

Here, in the imaging lens with the configuration described above, when the same lens material is used for those of the first lens, the third lens, and the fourth lens, only two types of lens materials are used to configure the imaging lens, so that it is possible to reduce the manufacturing cost of the imaging lens.

According to the imaging lens of the invention, it is possible to both reduce the size of the imaging lens and correct the aberrations properly, thereby making it possible to provide the imaging lens with relatively wide imaging angle of view.

DETAILED DESCRIPTION OF PREFERRED EMBODIMENTS (First Embodiment)

Hereunder, referring to the accompanying drawings, a first embodiment of the present invention will be fully described.

FIGS. 1, 4, 7, 10, and 13 are sectional views of image lenses in Numerical Data Examples 1 to 5 according to the embodiment, respectively. Since a basic lens configuration is the same among the Numerical Data Examples 1 to 5, the lens configuration of the embodiment will be described with reference to the lens sectional view of Numerical Data Example 1.

Figure 1:
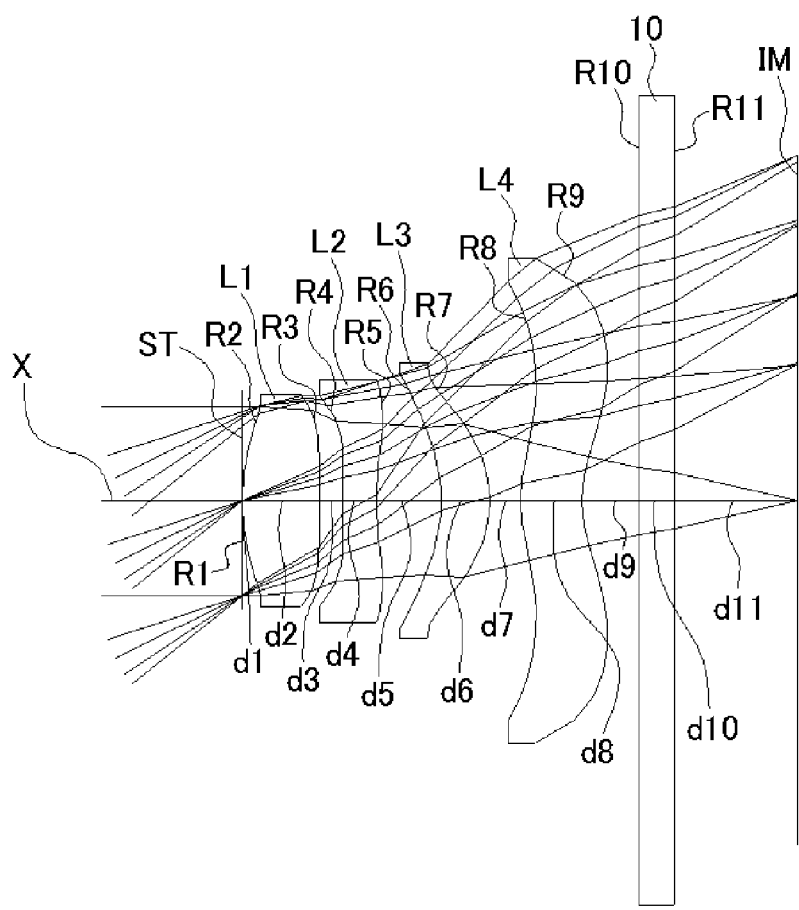
FIG. 1 is a schematic sectional view showing a configuration of an imaging lens in Numerical Data Example 1 according to a first embodiment of the invention.

As shown in FIG. 1, the imaging lens of the embodiment has an aperture stop ST; a first lens L1 having positive refractive power; a second lens L2 having negative refractive power; a third lens L3 having positive refractive power; and a fourth lens L4 having negative refractive power arranged in this order from an object side to an image side of the imaging lens. In other words, the imaging lens of this embodiment is configured as the one having an aperture stop on the front side, i.e. having an aperture stop ST on the object side of the first lens L1. Here, a filter 10 is provided between the fourth lens L4 and an image plane IM. It is noted that the filter 10 may be optionally omitted.

In the imaging lens with the configuration described above, the first lens L1 has a shape, in which both a curvature radius R2 thereof on the object side and a curvature radius R3 thereof on the image side are positive, i.e. a shape of a meniscus lens that directs the convex surface to the object side near an optical axis X. The second lens L2 has a shape, in which both a curvature radius R4 thereof on the object side and a curvature radius R5 thereof on the image side are positive, i.e. a shape of a meniscus lens that directs the convex surface to the object side near the optical axis X.

The third lens L3 has a shape, in which both a curvature radius R6 thereof on the object side and a curvature radius R7 thereof on the image side are negative, i.e. a shape of a meniscus lens that directs the concave surface to the object side near the optical axis X. The fourth lens L4 has a shape, in which both a curvature radius R8 thereof on the object side and a curvature radius R9 thereof on the image side are positive, i.e. a shape of a meniscus lens that directs the convex surface to the object side near the optical axis X.

The imaging lens of this embodiment satisfies the following conditional expressions (1) to (6). Therefore, according to the imaging lens of the embodiment, it is possible to attain both miniaturization and satisfactory aberration correction.

$$0.3 < |f1/f2| < 0.7 \quad (1)$$

$$1.5 < f12/f < 2.5 \quad (2)$$

$$1.5 < f23/f < 9.0 \quad (3)$$

$$0.2 < f12/f23 < 1.0 \quad (4)$$

$$0.05 < R1f/R1r < 0.25 \quad (5)$$

$$0.1 < R2f/R1r < 0.7 \quad (6)$$

In the above conditional expressions,
f: Focal length of the whole lens system
f1: Focal length of the first lens L1
f2: Focal length of the second lens L2
f12: Composite focal length of the first lens L1 and the second lens L2
f23: Composite focal length of the second lens L2 and the third lens L3
R1f: Curvature radius of a surface of the first lens L1 on the object side
R1r: Curvature radius of a surface of the first lens L1 on the image side
R2f: Curvature radius of a surface of the second lens L2 on the object side The imaging lens of the embodiment satisfies the following conditional expression (3A) to attain miniaturization of the imaging lens while further satisfactorily correcting the field curvature:

$$1.5 < f23/f < 6.5 \quad (3A)$$

Here, it is not necessary to satisfy all of the conditional expressions (1) to (6) (including the conditional expression (3A), which is hereinafter the same). When any single one of the conditional expressions (1) to (6) is individually satisfied, it is possible to obtain an effect corresponding to the respective conditional expression.

In the imaging lens of this embodiment, the second lens L2 the Abbe's number that is lower than those of the first lens L1, the third lens L3, and the fourth lens L4 and that is within the following range so as to restrain an axial chromatic aberration and off-axis chromatic aberration within satisfactory range.

Abbe's number of the first lens L1 for a d line vd1: $vd1 > 50$
Abbe's number of the second lens L2 for a d line vd2: $vd2 < 35$
Abbe's number of the third lens L3 for a d line vd3: $vd3 > 50$
Abbe's number of the fourth lens L4 for a d line vd4: $vd4 > 50$ In the embodiment, each lens has a lens surface that is formed to be an aspheric surface as necessary. When the aspheric surface applied to the lens surfaces have an axis Z in the optical axis direction, a height H in a direction perpendicular to the optical axis, a conical coefficient k, and aspheric coefficients $A_4$, $A_6$, $A_8$, $A_{10}$, $A_{12}$, $A_{14}$, and $A_{16}$, the aspheric surfaces of the lens surfaces may be expressed as follows (which will be the same in a second embodiment described below):

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{[Formula 1]}$$

Next, Numerical Data Examples of the embodiment will be described. In each of the Numerical Data Examples, f represents a focal length of a whole lens system, Fno represents an F number, and ω represents a half angle of view, respectively. In addition, i represents a surface number counted from the object side, R represents a curvature radius, d represents a distance between lens surfaces (surface spacing) on the optical axis, Nd represents a refractive index for a d line, and vd represents Abbe's number for the d line, respectively. Here, aspheric surfaces are indicated with surface numbers i affixed with * (asterisk).

NUMERICAL DATA EXAMPLE 1

Basic lens data are shown below.

f = 3.650 mm, Fno = 2.226, ω = 39.28°
Unit: mm

Surface Data

| Surface Number i | R | d | Nd | vd |
|---|---|---|---|---|
| (Object) | ∞ | ∞ | | |
| 1 (Stop) | ∞ | 0.0000 | | |
| 2* | 1.999 (=R1f) | 0.6600 | 1.52470 | 56.2 (=vd1) |
| 3* | 27.793 (=R1r) | 0.2000 | | |
| 4* | 9.264 (=R2f) | 0.3000 | 1.61420 | 26.0 (=vd2) |
| 5* | 3.154 | 0.5600 | | |
| 6* | −1.281 | 0.4200 | 1.54340 | 56.0 (=vd3) |
| 7* | −1.055 | 0.2600 | | |
| 8* | 1.091 | 0.5250 | 1.52470 | 56.2 (=vd4) |
| 9* | 0.893 | 0.5000 | | |
| 10 | ∞ | 0.3000 | 1.51633 | 64.1 |
| 11 | ∞ | 1.0701 | | |
| (Image plane) | ∞ | | | | f1 = 4.069 mm
f2 = −7.934 mm
f12 = 6.706 mm
f23 = 19.718 mm

Aspheric Surface Data

Second Surface k = −4.294173E−01, $A_4$ = 2.684306E−02, $A_6$ = −1.530709E−01, $A_8$ = 2.602430E−01, $A_{10}$ = −2.448736E−01

Third Surface k = 0.000000, $A_4$ = −6.080442E−02, $A_6$ = −4.573234E−01, $A_8$ = 5.368732E−01, $A_{10}$ = −2.824423E−01

Fourth Surface k = 0.000000, $A_4$ = −9.711859E−02, $A_6$ = −8.900873E−01, $A_8$ = 9.325950E−01, $A_{10}$ = −2.514303E−01

-continued f = 3.650 mm, Fno = 2.226, ω = 39.28°
Unit: mm

Fifth Surface k = 7.044876, $A_4$ = 8.517387E−03, $A_6$ = −6.211149E−01, $A_8$ = 8.568767E−01, $A_{10}$ = −6.142470E−01, $A_{12}$ = 1.694307E−01, $A_{14}$ = −4.588471E−03

Sixth Surface k = −2.468875, $A_4$ = 9.209350E−02, $A_6$ = −9.063033E−02, $A_8$ = −4.852762E−02, $A_{10}$ = 5.447794E−02, $A_{12}$ = 2.646940E−01, $A_{14}$ = −4.069938E−01, $A_{16}$ = 1.595617E−01

Seventh Surface k = −5.012411E−01, $A_4$ = −2.467622E−01, $A_6$ = 8.211085E−01, $A_8$ = −1.150718, $A_{10}$ = 8.110085E−01, $A_{12}$ = −1.142619E−01, $A_{14}$ = −9.475051E−02, $A_{16}$ = 2.929543E−02

Eighth Surface k = −1.045995E+01, $A_4$ = −1.586746E−01, $A_6$ = 1.054576E−01, $A_8$ = −5.552878E−02, $A_{10}$ = 1.916989E−02, $A_{12}$ = −3.709117E−03, $A_{14}$ = 2.972517E−04

Ninth Surface k = −5.570027, $A_4$ = −1.470119E−01, $A_6$ = 8.479959E−02, $A_8$ = −4.342697E−02, $A_{10}$ = 1.508362E−02, $A_{12}$ = −3.432991E−03, $A_{14}$ = 4.622828E−04, $A_{16}$ = −2.861244E−05

The values of the respective conditional expressions are as follows:

$|f1/f2|$=0.513

$f12/f$=1.837

$f23/f$=5.402

$f12/f23$=0.340

$R1f/R1r$=0.072

$R2f/R1r$=0.333

Accordingly, the imaging lens of Numerical Data Example 1 satisfies the conditional expressions (1) to (6). An on-axis distance (a length in air) from the surface of the aperture stop ST to the image plane IM is 4.693 mm, and therefore the size of the imaging lens is reduced. Moreover, the half angle of view ω in the imaging lens is 39.28° and therefore the imaging lens of the invention has wider angle of view than that of a conventional imaging lens.

Figure 2:
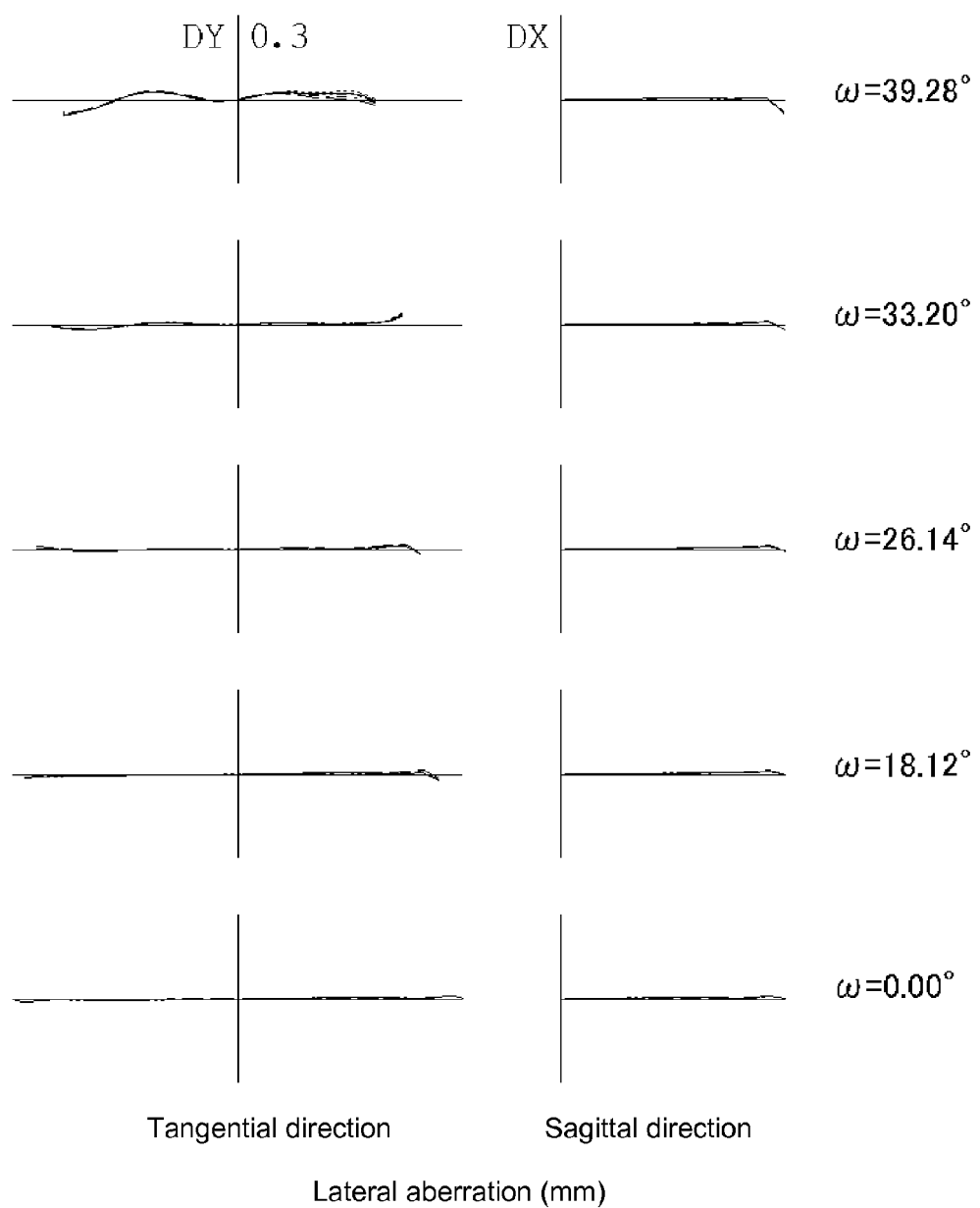
FIG. 2 is an aberration diagram showing a lateral aberration of the imaging lens of FIG. 1.
Figure 3:
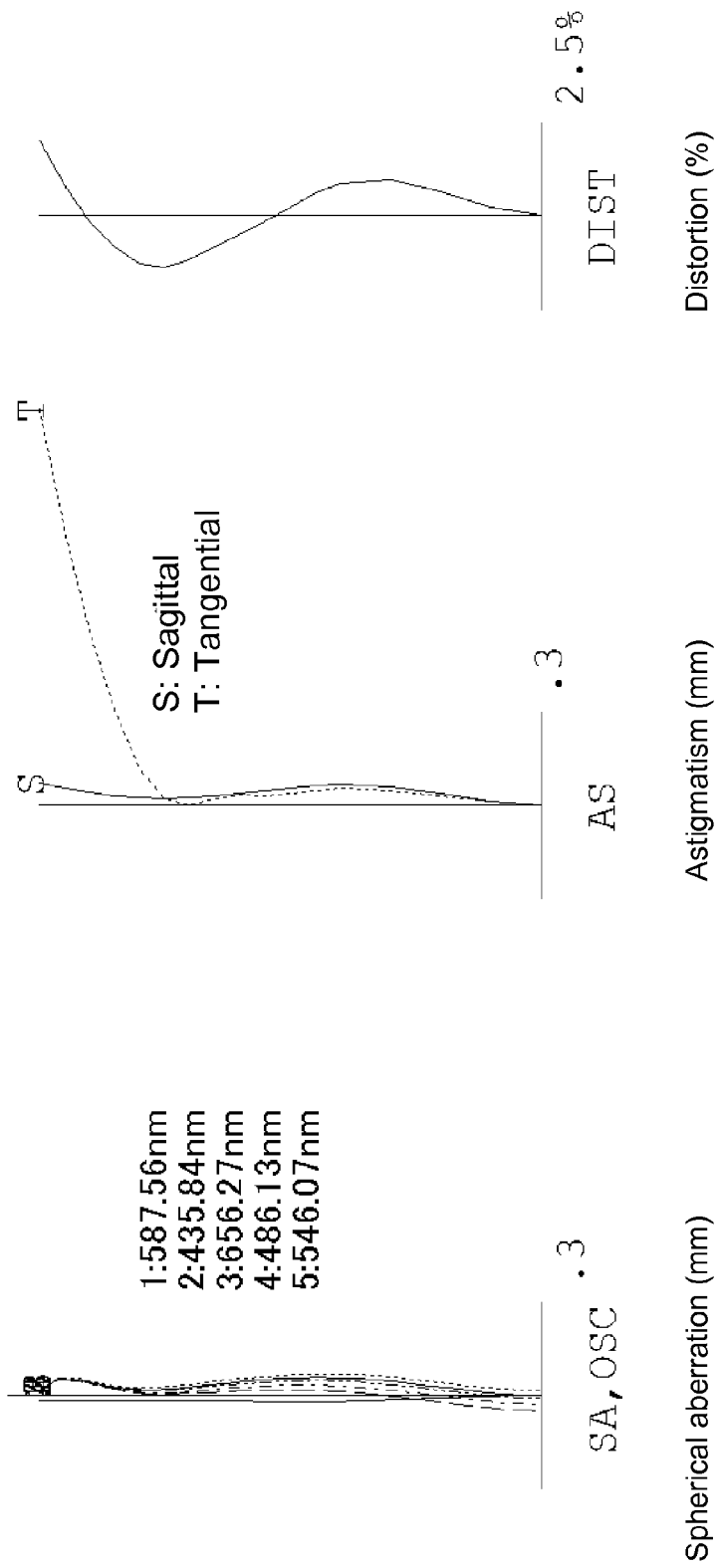
FIG. 3 is an aberration diagram showing a spherical aberration, an astigmatism, and a distortion of the imaging lens of FIG. 1.
Figure 4:
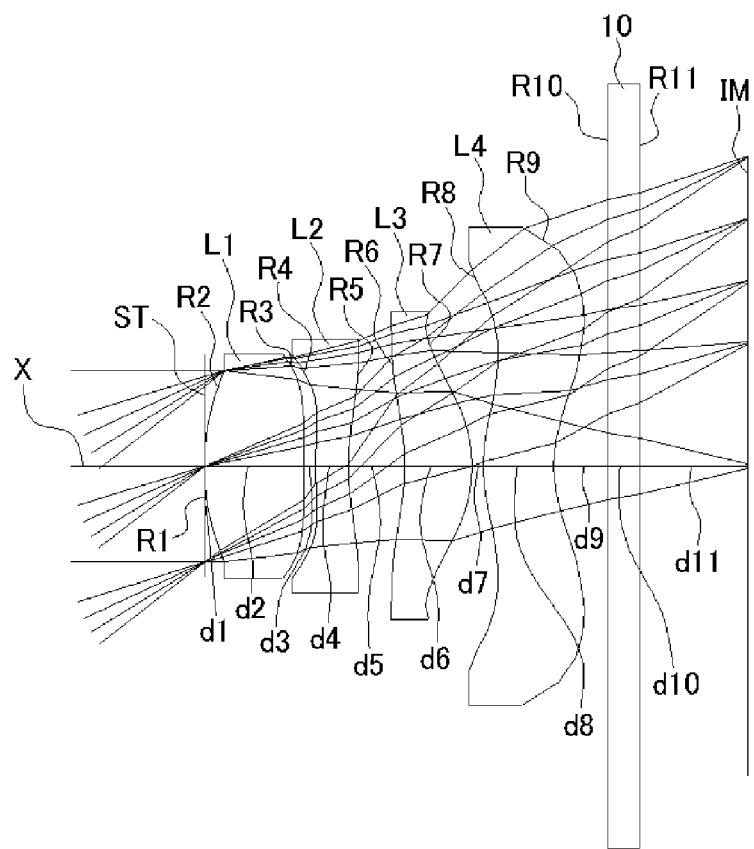
FIG. 4 is a schematic sectional view showing a configuration of an imaging lens in Numerical Data Example 2 according to the embodiment.

FIG. 2 shows the lateral aberration that corresponds to the half angle of view ω in the imaging lens of Numerical Data Example 1 by dividing into a tangential direction and sagittal direction (which is also the same in FIGS. 5, 8, 11, 14, and 17). Furthermore, FIG. 3 shows a spherical aberration SA (mm), an astigmatism AS (mm), and a distortion DIST (%) of the imaging lens of Numerical Data Example 1, respectively. In the aberration diagrams, the Offence against the Sine Condition (OSC) is also indicated for the spherical aberration diagram in addition to the aberrations at the respective wavelengths of 587.56 nm, 435.84 nm, 656.27 nm, 486.13 nm, and 546.07 nm. Further, in the astigmatism diagram, the aberration on the sagittal image surface S and the aberration on tangential image surface T are respectively indicated (which are the same in FIGS. 6, 9, 12, 15, and 18). As shown in FIGS. 2 and 3, in the imaging lens of Numerical Data Example 1, the image surface is satisfactorily corrected and the respective aberrations are suitably corrected.

Furthermore, when an aperture diameter of the aperture stop ST is D, the imaging lens satisfies the following conditional expressions (7) and (7A):

$$1.5 < f/D < 2.8 \quad (7)$$

$$1.8 < f/D < 2.6 \quad (7A)$$

The aperture diameter D of Numerical Example 1 is 1.64 mm and f/D=2.226, so that the imaging lens satisfies the conditional expressions (7) and (7A).

NUMERICAL DATA EXAMPLE 2

Basic lens data are shown below.

f = 3.599 mm, Fno = 2.045, ω = 38.23°
Unit: mm

Surface Data

| Surface Number i | R | d | Nd | vd |
|---|---|---|---|---|
| (Object) | ∞ | ∞ | | |
| 1 (Stop) | ∞ | 0.0000 | | |
| 2* | 2.187 (=R1f) | 0.9074 | 1.52510 | 56.0 (=vd1) |
| 3* | 15.009 (=R1r) | 0.1060 | | |
| 4* | 4.348 (=R2f) | 0.3061 | 1.58500 | 30.0 (=vd2) |
| 5* | 2.728 | 0.5093 | | |
| 6* | −1.837 | 0.6200 | 1.54340 | 56.0 (=vd3) |
| 7* | −1.264 | 0.1000 | | |
| 8* | 1.382 | 0.6395 | 1.52510 | 56.0 (=vd4) |
| 9* | 1.022 | 0.5000 | | |
| 10 | ∞ | 0.3000 | 1.51633 | 64.1 |
| 11 | ∞ | 0.9887 | | |
| (Image plane) | ∞ | | | | f1 = 4.759 mm
f2 = −13.454 mm
f12 = 6.379 mm
f23 = 7.943 mm
Aspheric Surface Data Second Surface k = −5.413611E−01, $A_4$ = 5.734159E−03, $A_6$ = −2.488952E−02, $A_8$ = 5.144506E−02, $A_{10}$ = −4.949244E−02

Third Surface k = 0.000000, $A_4$ = −1.307873E−01, $A_6$ = −2.237479E−01, $A_8$ = 2.445900E−01, $A_{10}$ = −9.247497E−02

Fourth Surface k = 0.000000, $A_4$ = −2.094479E−01, $A_6$ = −4.578687E−01, $A_8$ = 4.376371E−01, $A_{10}$ = −6.249432E−02, $A_{12}$ = −8.083219E−03, $A_{14}$ = −1.205822E−02

Fifth Surface k = 3.743995, $A_4$ = −3.871051E−02, $A_6$ = −2.733278E−01, $A_8$ = 2.653755E−01, $A_{10}$ = −9.896775E−02, $A_{12}$ = −5.754555E−04, $A_{14}$ = 4.347418E−03

Sixth Surface k = −2.374863E+01, $A_4$ = −3.068091E−02, $A_6$ = 1.416194E−01, $A_8$ = −1.038813E−01, $A_{10}$ = 2.719287E−02, $A_{12}$ = −5.967014E−05, $A_{14}$ = −1.076287E−03

Seventh Surface k = −1.018344, $A_4$ = 9.337221E−03, $A_6$ = 2.119575E−02, $A_8$ = 2.049187E−02, $A_{10}$ = −3.475389E−03, $A_{12}$ = −3.546406E−04, $A_{14}$ = −1.175574E−04

-continued f = 3.599 mm, Fno = 2.045, ω = 38.23°
Unit: mm

Eighth Surface k = −8.782313, $A_4$ = −1.259258E−01, $A_6$ = 5.926253E−02, $A_8$ = −3.390384E−02, $A_{10}$ = 1.500142E−02, $A_{12}$ = −3.939049E−03, $A_{14}$ = 4.388616E−04, $A_{16}$ = −8.527817E−07
Ninth Surface k = −4.882503, $A_4$ = −8.297006E−02, $A_6$ = 1.963493E−02, $A_8$ = −1.569957E−03, $A_{10}$ = −1.185617E−03, $A_{12}$ = 3.671424E−04, $A_{14}$ = −3.484604E−05, $A_{16}$ = −6.039792E−08

The values of the respective conditional expressions are as follows:

|f1/f2|=0.354 f12/f=1.772 f23/f=2.207 f12/f23=0.803

R1f/R1r=0.146

R2f/R1r=0.290

Accordingly, the imaging lens of Numerical Data Example 2 satisfies the conditional expressions (1) to (6). An on-axis distance (a length in air) from the surface of the aperture stop ST to the image plane IM is 4.693 mm, and therefore the size of the imaging lens is reduced. Moreover, the half angle of view ω in the imaging lens is 38.23° and therefore the imaging lens of the invention has a wider angle of view than that of conventional imaging lens.

Figure 5:
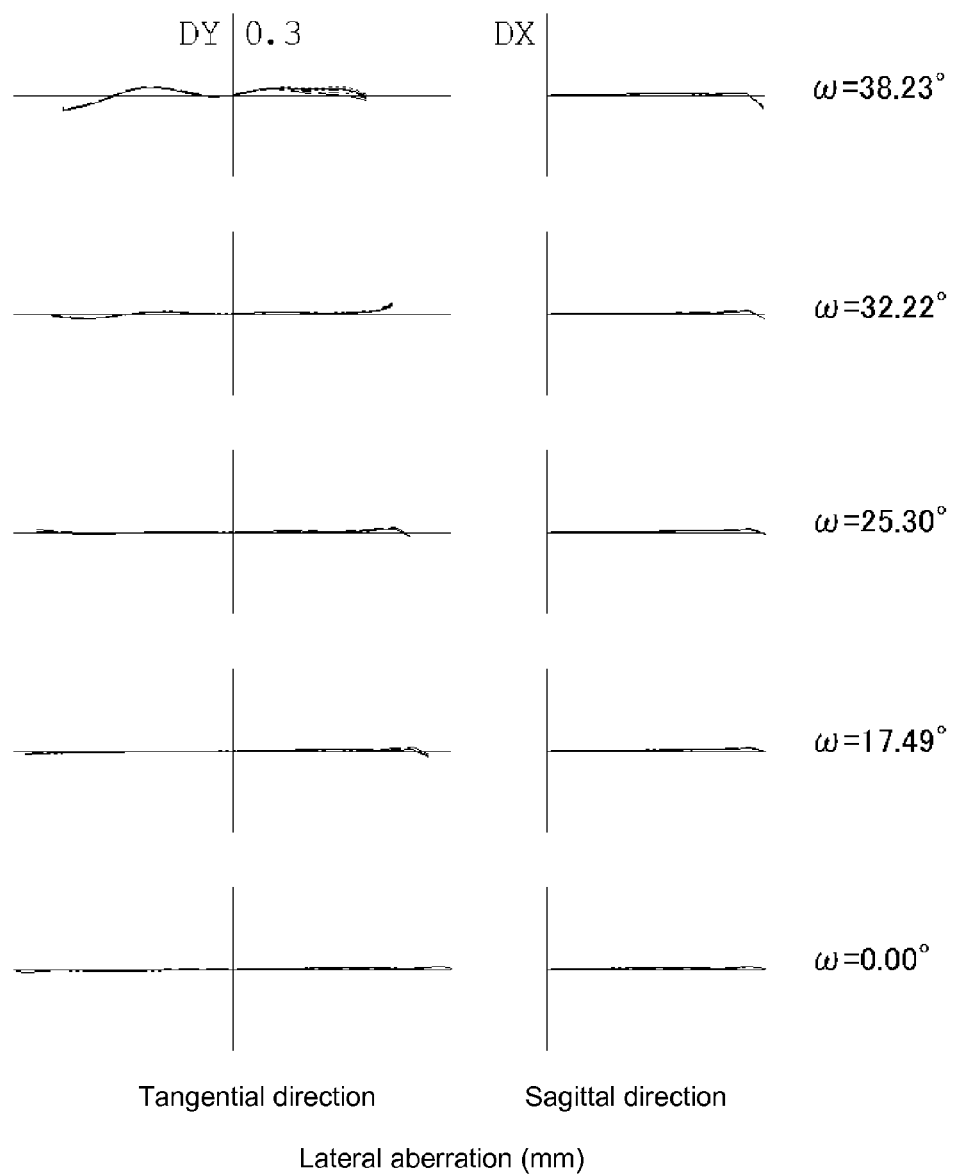
FIG. 5 is an aberration diagram showing a lateral aberration of the imaging lens of FIG. 4.
Figure 6:
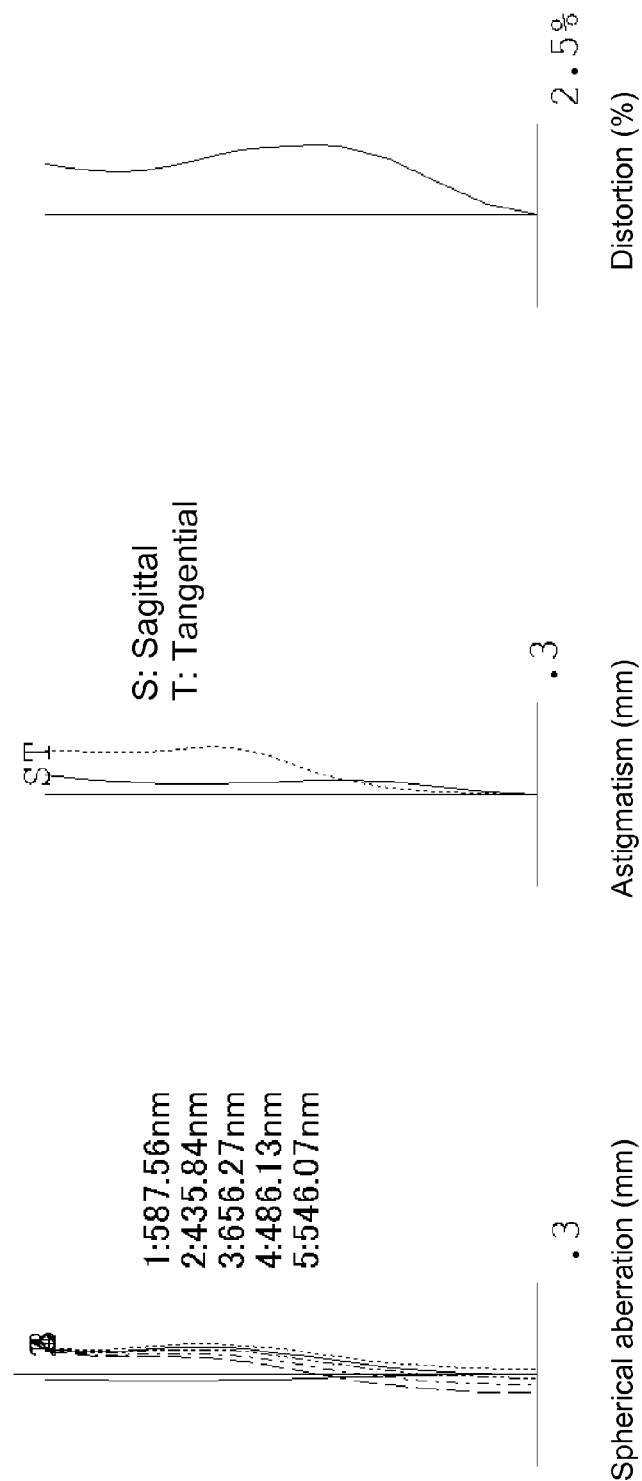
FIG. 6 is an aberration diagram showing a spherical aberration, an astigmatism, and a distortion of the imaging lens of FIG. 4.
Figure 7:
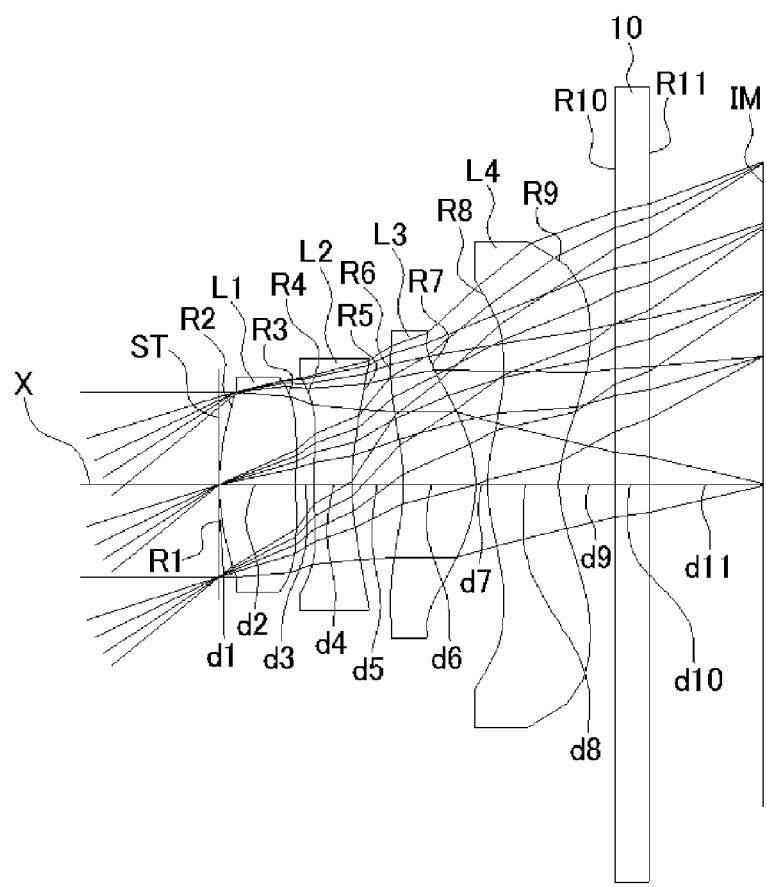
FIG. 7 is a schematic sectional view showing a configuration of an imaging lens in Numerical Data Example 3 according to the embodiment.

FIG. 5 shows the lateral aberration that corresponds to the half angle of view ω in the imaging lens of Numerical Data Example 2. Furthermore, FIG. 6 shows the spherical aberration SA (mm), the astigmatism AS (mm), and the distortion DIST (%) of the imaging lens, respectively. As shown in FIGS. 5 and 6, in the imaging lens of Numerical Data Example 2, the image surface is also satisfactorily corrected and the respective aberrations are suitably corrected, similarly to Numerical Data Example 1.

The imaging lens of Numerical Data Example 2 also satisfies the conditional expressions (7) and (7A) similarly to Numerical Data Example 1. In Numerical Data Example 2, the aperture diameter D is 1.76 mm and f/D=2.045, and therefore the imaging lens of Numerical Data Example 2 also satisfies the conditional expressions (7) and (7A).

NUMERICAL DATA EXAMPLE 3

Basic lens data are shown below.

f = 3.521 mm, Fno = 2.147, ω = 38.84°
Unit: mm

Surface Data

| Surface Number i | R | d | Nd | vd |
|---|---|---|---|---|
| (Object) | ∞ | ∞ | | |
| 1 (Stop) | ∞ | 0.0000 | | |
| 2* | 2.120 (=R1f) | 0.6750 | 1.53110 | 56.0 (=vd1) |
| 3* | 14.085 (=R1r) | 0.1600 | | |
| 4* | 4.355 (=R2f) | 0.3358 | 1.58500 | 30.0 (=vd2) |
| 5* | 2.679 | 0.4480 | | |
| 6* | −1.763 | 0.6400 | 1.53110 | 56.0 (=vd3) |
| 7* | −1.212 | 0.1047 | | |
| 8* | 1.300 | 0.6220 | 1.53110 | 56.0 (=vd4) |
| 9* | 0.936 | 0.5000 | | |
| 10 | ∞ | 0.3000 | 1.51633 | 64.1 |
| 11 | ∞ | 0.9960 | | |
| (Image plane) | ∞ | | | | f1 = 4.609 mm
f2 = −12.850 mm
f12 = 6.231 mm
f23 = 7.704 mm
Aspheric Surface Data Second Surface k = −2.011926E−01, $A_4$ = 4.474444E−03, $A_6$ = −8.050007E−02, $A_8$ = 1.105939E−01, $A_{10}$ = −1.175094E−01
Third Surface k = 0.000000, $A_4$ = −1.532164E−01, $A_6$ = −1.331893E−01, $A_8$ = 1.589361E−01, $A_{10}$ = −9.474531E−02
Fourth Surface k = 0.000000, $A_4$ = −1.874644E−01, $A_6$ = −3.946004E−01, $A_8$ = 3.959899E−01, $A_{10}$ = −3.055247E−02, $A_{12}$ = −3.860543E−02, $A_{14}$ = −2.224384E−03
Fifth Surface k = 1.544106, $A_4$ = 2.066459E−03, $A_6$ = −2.627288E−01, $A_8$ = 2.779627E−01, $A_{10}$ = −9.010830E−02, $A_{12}$ = −2.162890E−02, $A_{14}$ = 1.531997E−02
Sixth Surface k = −1.619538E+01, $A_4$ = −9.809241E−03, $A_6$ = 1.411887E−01, $A_8$ = −1.075657E−01, $A_{10}$ = 2.998480E−02, $A_{12}$ = 2.706104E−03, $A_{14}$ = −3.165825E−03
Seventh Surface k = −1.037851, $A_4$ = −1.282144E−02, $A_6$ = 4.784513E−02, $A_8$ = 1.469272E−02, $A_{10}$ = −4.113369E−03, $A_{12}$ = 9.159603E−04, $A_{14}$ = −6.784094E−04
Eighth Surface k = −8.105715, $A_4$ = −1.396818E−01, $A_6$ = 7.242010E−02, $A_8$ = −3.573891E−02,
$A_{10}$ = 1.453834E−02, $A_{12}$ = −4.055814E−03, $A_{14}$ = 4.552089E−04, $A_{16}$ = 9.047104E−06
Ninth Surface k = −4.974160, $A_4$ = −9.060108E−02, $A_6$ = 2.414853E−02, $A_8$ = −2.729651E−03, $A_{10}$ = −1.069978E−03, $A_{12}$ = 3.581690E−04, $A_{14}$ = −3.230770E−05, $A_{16}$ = −6.723086E−07

The values of the respective conditional expressions are as follows:

|f1/f2|=0.359 f12/f=1.770 f23/f=2.188 f12/f23=0.809

R1f/R1r=0.151

R2f/R1r=0.309

Accordingly, the imaging lens of Numerical Data Example 3 satisfies the conditional expressions (1) to (6). An on-axis distance (a length in air) from the surface of the aperture stop ST to the image plane IM is 4.679 mm, and therefore the size of the imaging lens is reduced. Moreover, the half angle of view ω in the imaging lens is 38.84° and therefore the imaging lens of the invention has a wider angle of view than that of conventional imaging lens.

Figure 8:
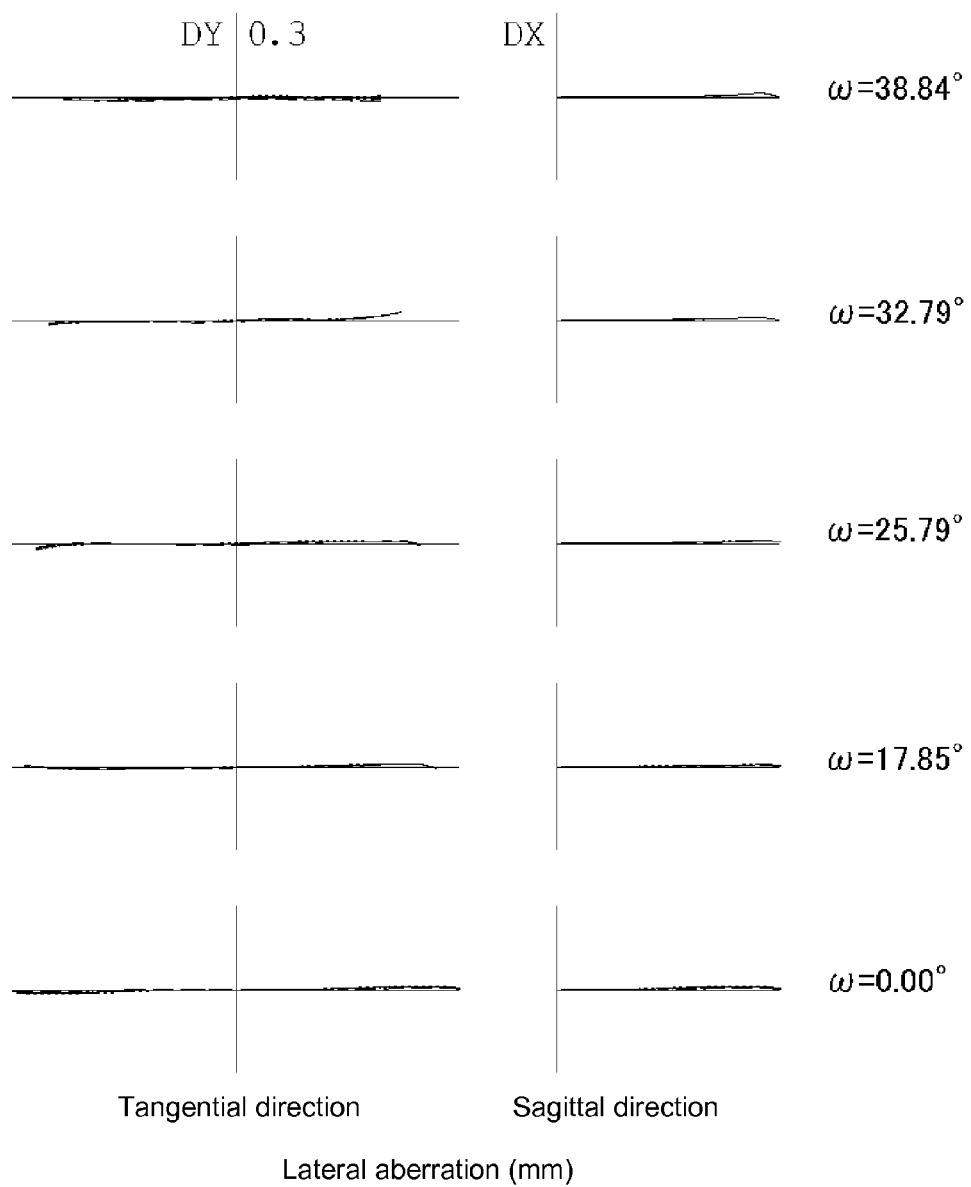
FIG. 8 is an aberration diagram showing a lateral aberration of the imaging lens of FIG. 7.
Figure 9:
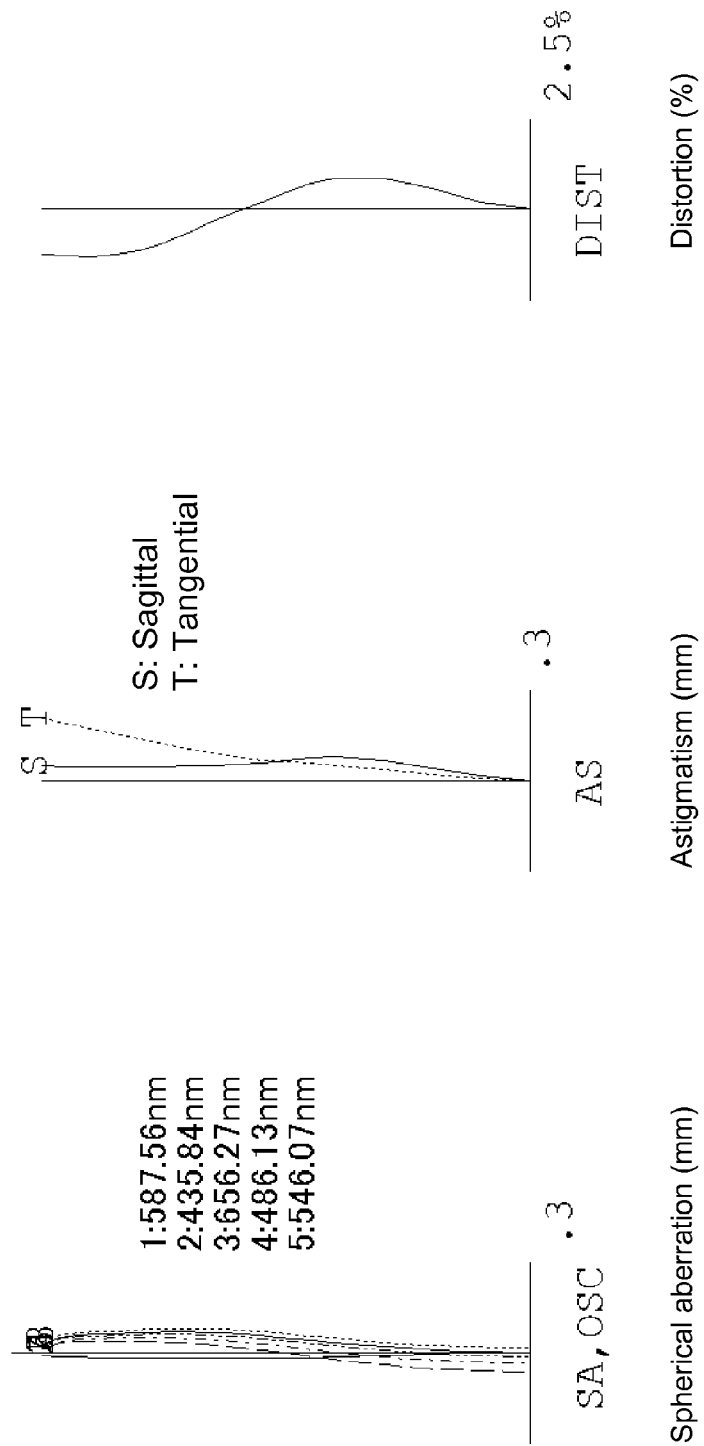
FIG. 9 is an aberration diagram showing a spherical aberration, an astigmatism, and a distortion of the imaging lens of FIG. 7.
Figure 10:
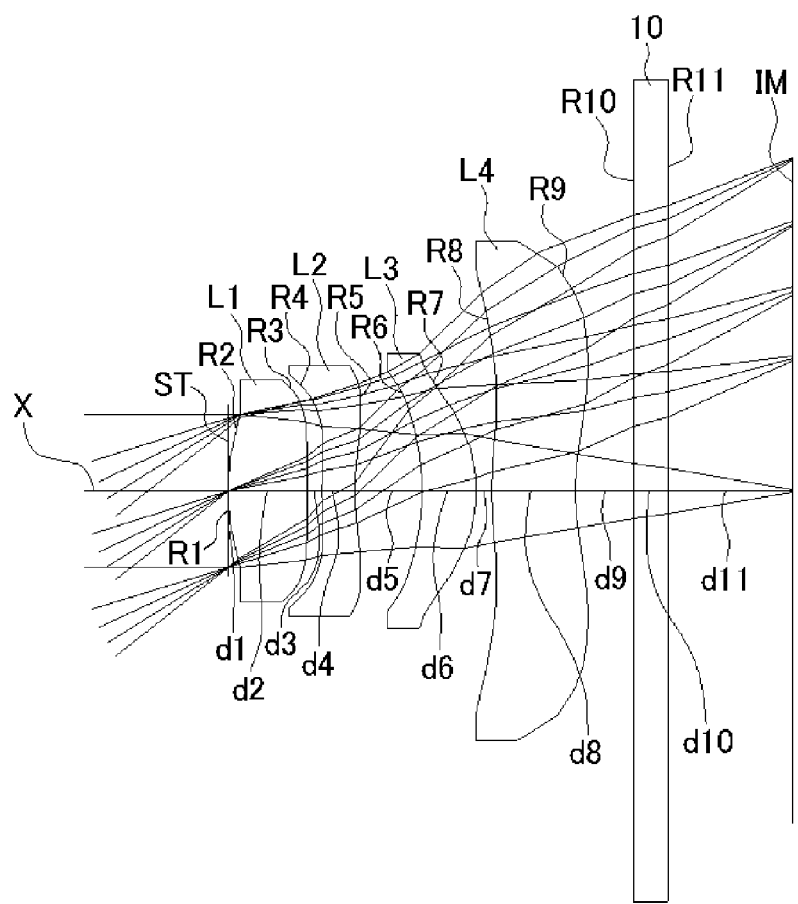
FIG. 10 is a schematic sectional view showing a configuration of an imaging lens in Numerical Data Example 4 according to the embodiment.

FIG. 8 shows the lateral aberration that corresponds to the half angle of view ω in the imaging lens of Numerical Data Example 3. FIG. 9 shows the spherical aberration SA (mm), the astigmatism AS (mm), and the distortion DIST (%) of the imaging lens, respectively. As shown in FIGS. 8 and 9, in the imaging lens of Numerical Data Example 3, the image surface is also satisfactorily corrected and the respective aberrations are suitably corrected, similarly to Numerical Data Example 1.

The imaging lens of Numerical Data Example 3 also satisfies the conditional expressions (7) and (7A) similarly to Numerical Data Example 1. In Numerical Data Example 3, the aperture diameter D is 1.64 mm and f/D=2.147, and therefore the imaging lens of Numerical Data Example 3 also satisfies the conditional expressions (7) and (7A).

NUMERICAL DATA EXAMPLE 4

Basic lens data are shown below.

f = 3.577 mm, Fno = 2.752, ω = 38.40°
Unit: mm

Surface Data

| Surface Number i | R | d | Nd | vd |
|---|---|---|---|---|
| (Object) | ∞ | ∞ | | |
| 1 (Stop) | ∞ | 0.0000 | | |
| 2* | 1.964 (=R1f) | 0.6704 | 1.52470 | 56.2 (=vd1) |
| 3* | 10.021 (=R1r) | 0.1307 | | |
| 4* | 4.500 (=R2f) | 0.2800 | 1.61420 | 26.0 (=vd2) |
| 5* | 2.722 | 0.5757 | | |
| 6* | −1.963 | 0.4581 | 1.54340 | 56.0 (=vd3) |
| 7* | −1.314 | 0.1278 | | |
| 8* | 2.298 | 0.7101 | 1.52470 | 56.2 (=vd4) |
| 9* | 1.900 | 0.5000 | | |
| 10 | ∞ | 0.3000 | 1.51633 | 64.1 |
| 11 | ∞ | 1.0512 | | |
| (Image plane) | ∞ | | | | f1 = 4.526 mm
f2 = −11.932 mm
f12 = 6.327 mm
f23 = 9.864 mm

Aspheric Surface Data

Second Surface k = 9.918511E−01, $A_4$ = −1.957852E−03, $A_6$ = −1.314480E−01, $A_8$ = 2.195975E−01, $A_{10}$ = −2.331107E−01
Third Surface k = 0.000000, $A_4$ = −2.266445E−01, $A_6$ = −6.509532E−02, $A_8$ = 9.652916E−03, $A_{10}$ = −4.890732E−02
Fourth Surface k = 0.000000, $A_4$ = −3.614299E−01, $A_6$ = −2.358310E−01, $A_8$ = 2.731155E−01, $A_{10}$ = −6.868279E−02

-continued f = 3.577 mm, Fno = 2.752, ω = 38.40°
Unit: mm

Fifth Surface k = 4.658208, $A_4$ = −1.699714E−01, $A_6$ = −2.806178E−01, $A_8$ = 5.693611E−01, $A_{10}$ = −6.211758E−01, $A_{12}$ = 3.698189E−01, $A_{14}$ = −1.158143E−01
Sixth Surface k = −1.031219E+01, $A_4$ = −1.109788E−01, $A_6$ = 8.764705E−02, $A_8$ = −8.000960E−02, $A_{10}$ = −9.543576E−02, $A_{12}$ = 2.917394E−01, $A_{14}$ = −2.662451E−01, $A_{16}$ = 7.679792E−02
Seventh Surface k = −5.588321E−01, $A_4$ = −2.683770E−01, $A_6$ = 7.608248E−01, $A_8$ = −1.112022, $A_{10}$ = 8.084299E−01, $A_{12}$ = −1.272411E−01, $A_{14}$ = −1.076784E−01, $A_{16}$ = 3.808153E−02
Eighth Surface k = −3.781407E+01, $A_4$ = −1.524210E−01, $A_6$ = 1.080195E−01, $A_8$ = −5.165639E−02, $A_{10}$ = 1.820386E−02, $A_{12}$ = −4.107256E−03, $A_{14}$ = 4.023927E−04
Ninth Surface k = −6.010517, $A_4$ = −1.571072E−01, $A_6$ = 1.010521E−01, $A_8$ = −5.123586E−02, $A_{10}$ = 1.761692E−02, $A_{12}$ = −3.912575E−03, $A_{14}$ = 4.997289E−04, $A_{16}$ = −2.863251E−05

The values of the respective conditional expressions are as follows:

|f1/f2|=0.379 f12/f=1.769 f23/f=2.758 f12/f23=0.641

R1f/R1r=0.196

R2f/R1r=0.449

Accordingly, the imaging lens of Numerical Data Example 4 satisfies the conditional expressions (1) to (6). An on-axis distance (a length in air) from the surface of the aperture stop ST to the image plane IM is 4.702 mm, and therefore the size of the imaging lens is reduced. Moreover, the half angle of view ω in the imaging lens is 38.40° and therefore the imaging lens of the invention has a wider angle of view than that of conventional imaging lens.

Figure 11:
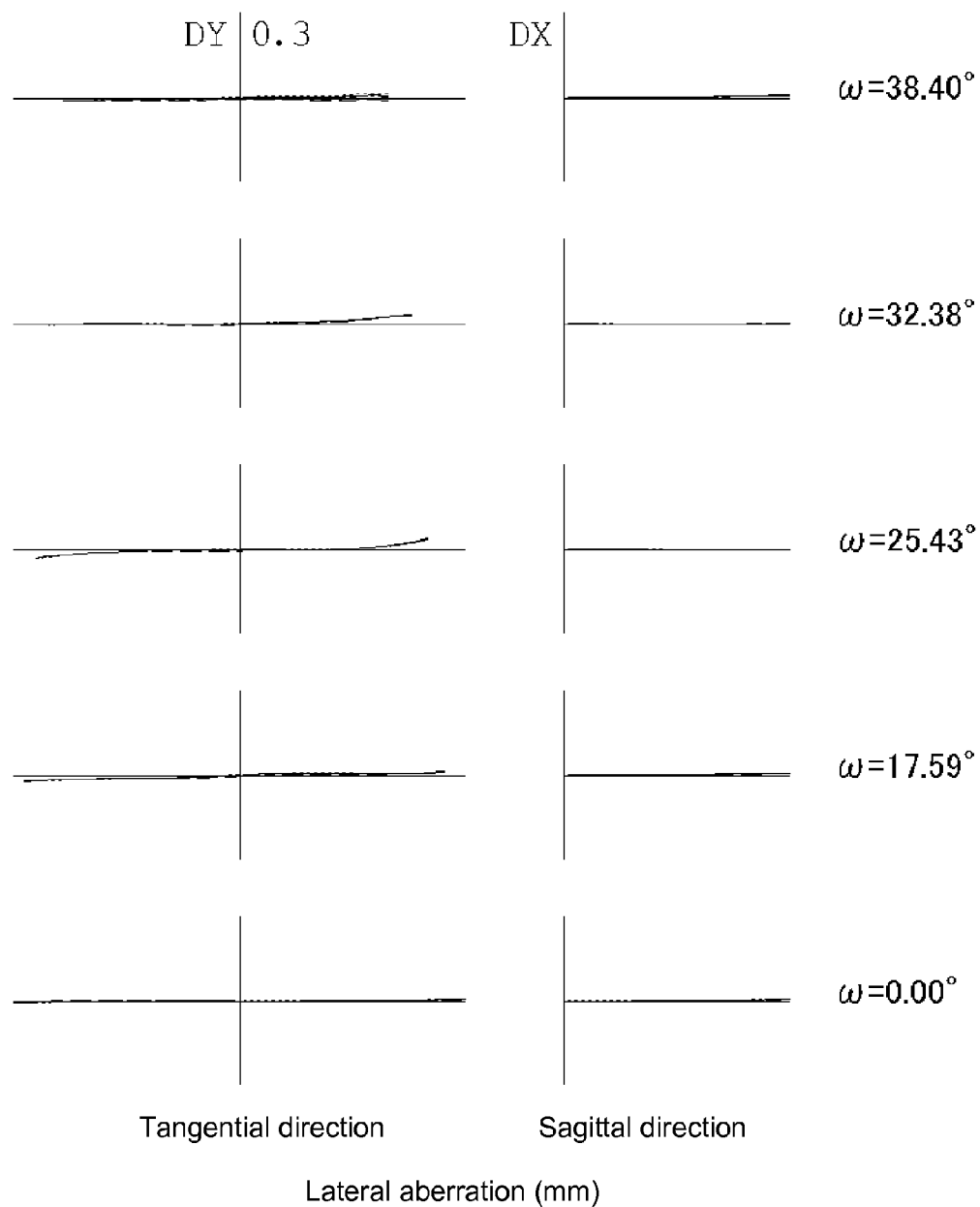
FIG. 11 is an aberration diagram showing a lateral aberration of the imaging lens of FIG. 10.
Figure 12:
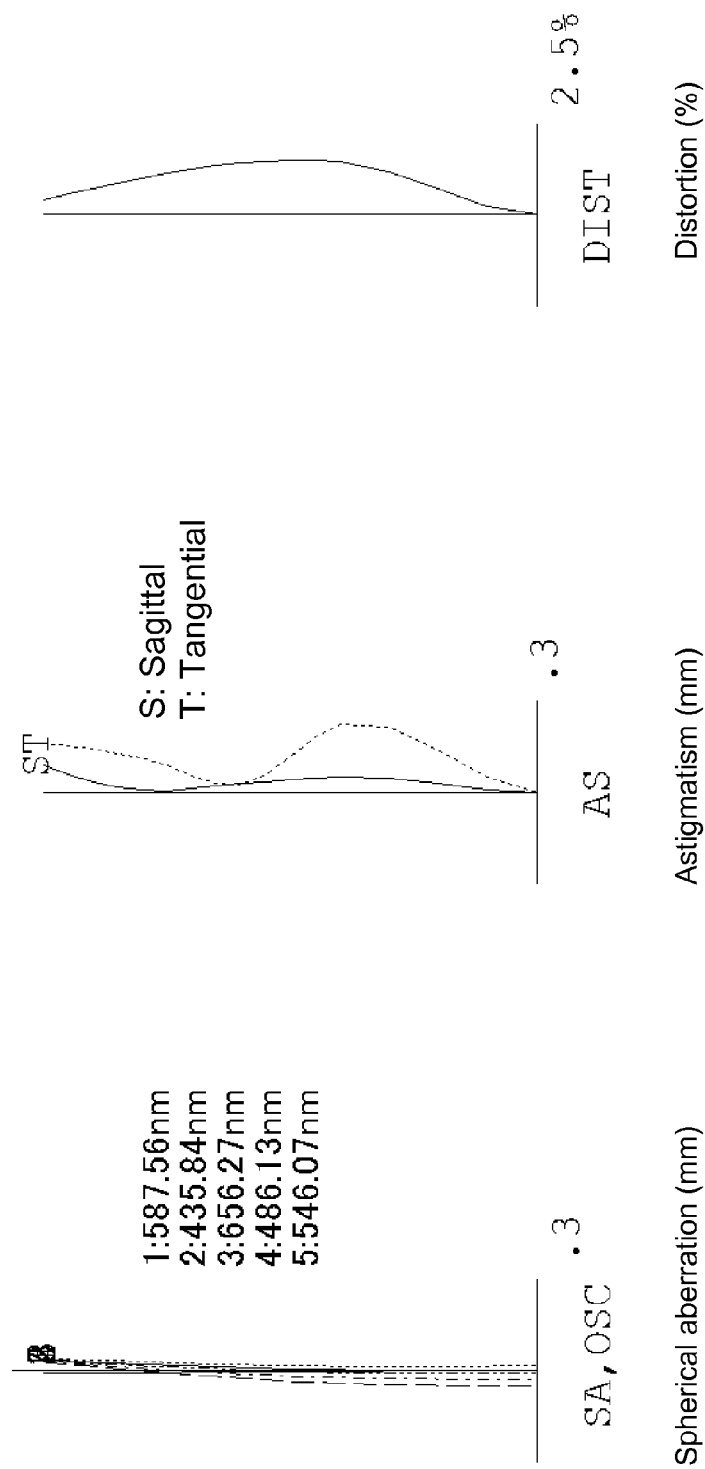
FIG. 12 is an aberration diagram showing a spherical aberration, an astigmatism, and a distortion of the imaging lens of FIG. 10.
Figure 13:
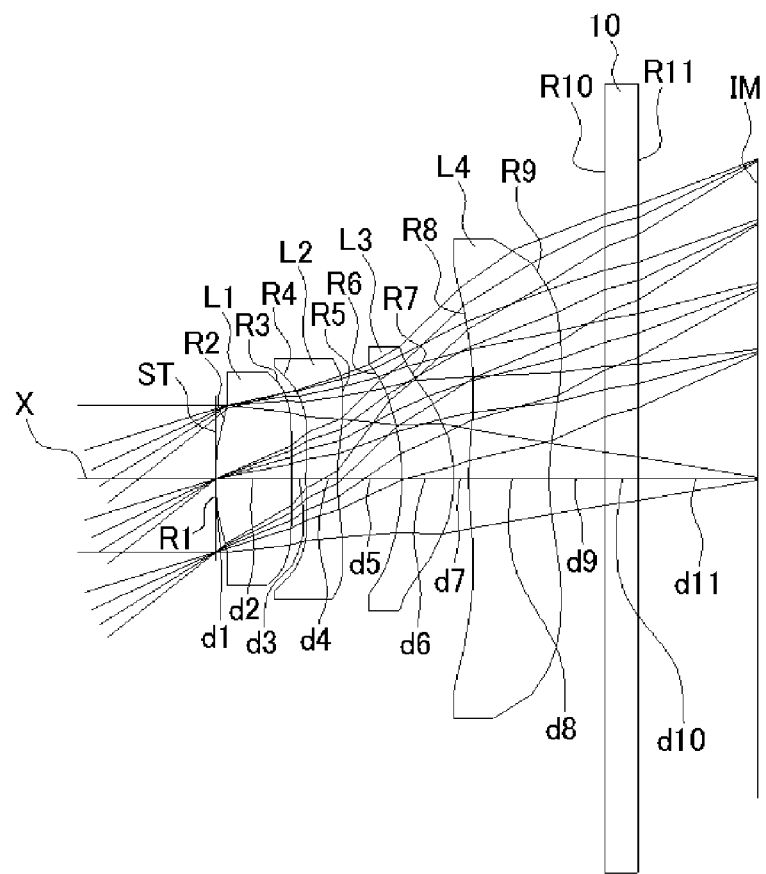
FIG. 13 is a schematic sectional view showing a configuration of an imaging lens in Numerical Data Example 5 according to the embodiment.

FIG. 11 shows the lateral aberration that corresponds to the half angle of view ω in the imaging lens of Numerical Data Example 4. FIG. 12 shows the spherical aberration SA (mm), the astigmatism AS (mm), and the distortion DIST (%) of the imaging lens, respectively. As shown in FIGS. 11 and 12, in the imaging lens of Numerical Data Example 4, the image surface is also satisfactorily corrected and the respective aberrations are suitably corrected, similarly to Numerical Data Example 1.

The imaging lens of Numerical Data Example 4 satisfies the conditional expression (7). In Numerical Data Example 4, the aperture diameter D is 1.30 mm and f/D=2.752, and therefore the imaging lens of Numerical Data Example 4 also satisfies the conditional expression (7).

NUMERICAL DATA EXAMPLE 5

Basic lens data are shown below.

f = 3.612 mm, Fno = 2.286, ω = 38.13°
Unit: mm

Surface Data

| Surface Number i | R | d | Nd | vd |
|---|---|---|---|---|
| (Object) | ∞ | ∞ | | |
| 1 (Stop) | ∞ | 0.0000 | | |
| 2* | 2.040 (=R1f) | 0.7425 | 1.52470 | 56.2 (=vd1) |
| 3* | 10.395 (=R1r) | 0.1749 | | |
| 4* | 4.480 (=R2f) | 0.2797 | 1.58500 | 30.0 (=vd2) |
| 5* | 2.753 | 0.6125 | | |
| 6* | −1.508 | 0.5550 | 1.54340 | 56.0 (=vd3) |
| 7* | −1.151 | 0.1903 | | |
| 8* | 0.728 | 0.4327 | 1.52470 | 56.2 (=vd4) |
| 9* | 0.534 | 0.5000 | | |
| 10 | ∞ | 0.3000 | 1.51633 | 64.1 |
| 11 | ∞ | 0.9733 | | |
| (Image plane) | ∞ | | | | f1 = 4.694 mm
f2 = −12.984 mm
f12 = 6.388 mm
f23 = 8.836 mm

Aspheric Surface Data

Second Surface $k = 2.000000, A_4 = -2.896754E-02, A_6 = -1.042000E-01, A_8 = 1.524755E-01, A_{10} = -1.632185E-01$ Third Surface $k = 0.000000, A_4 = -2.243120E-01, A_6 = -2.895193E-04, A_8 = 5.421253E-06, A_{10} = -3.314123E-02$ Fourth Surface $k = 0.000000, A_4 = -3.935142E-01, A_6 = -9.871190E-02, A_8 = 2.049768E-01, A_{10} = -4.948524E-02$ Fifth Surface $k = 3.458396, A_4 = -1.718242E-01, A_6 = -2.123249E-01, A_8 = 5.809015E-01, A_{10} = -6.299274E-01, A_{12} = 3.369537E-01, A_{14} = -7.855216E-02$ Sixth Surface $k = -2.183891E+01, A_4 = -9.955067E-02, A_6 = 8.655396E-02, A_8 = -7.216926E-02, A_{10} = -8.119747E-02, A_{12} = 3.160869E-01, A_{14} = -2.913983E-01, A_{16} = 8.115157E-02$ Seventh Surface $k = -8.975433E-01, A_4 = -2.142795E-01, A_6 = 7.806568E-01, A_8 = -1.171224, A_{10} = 8.201011E-01, A_{12} = -1.334767E-01, A_{14} = -1.090951E-01, A_{16} = 3.971503E-02$ Eighth Surface $k = -7.308702, A_4 = -1.966497E-01, A_6 = 1.203847E-01, A_8 = -5.701863E-02, A_{10} = 1.987578E-02, A_{12} = -4.072236E-03, A_{14} = 3.397834E-04$ Ninth Surface $k = -4.014490, A_4 = -1.539383E-01, A_6 = 9.334127E-02, A_8 = -4.865596E-02, A_{10} = 1.752907E-02, A_{12} = -3.940954E-03, A_{14} = 4.915556E-04, A_{16} = -2.639107E-05$ The values of the respective conditional expressions are as follows:

$|f1/f2| = 0.362$ $f12/f = 1.769$ $f23/f = 2.446$ $f12/f23 = 0.723$ $R1f/R1r = 0.196$ $R2f/R1r = 0.431$

Accordingly, the imaging lens of Numerical Data Example 5 satisfies the conditional expressions (1) to (6). An on-axis distance (a length in air) from the surface of the aperture stop ST to the image plane IM is 4.659 mm, and therefore the size of the imaging lens is reduced. Moreover, the half angle of view ω in the imaging lens is 38.13° and therefore the imaging lens of the invention has a wider angle of view than that of conventional imaging lens.

Figure 14:
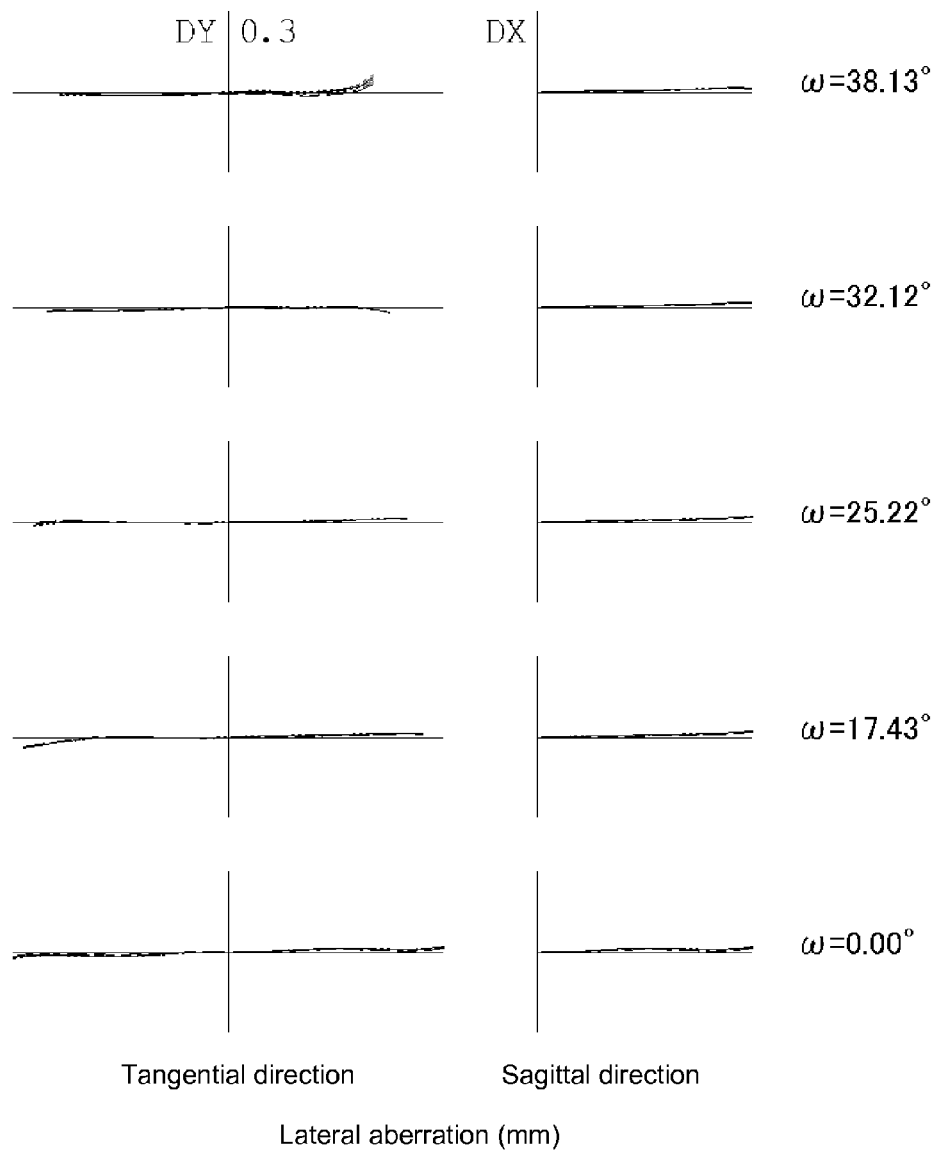
FIG. 14 is an aberration diagram showing a lateral aberration of the imaging lens of FIG. 13.
Figure 15:
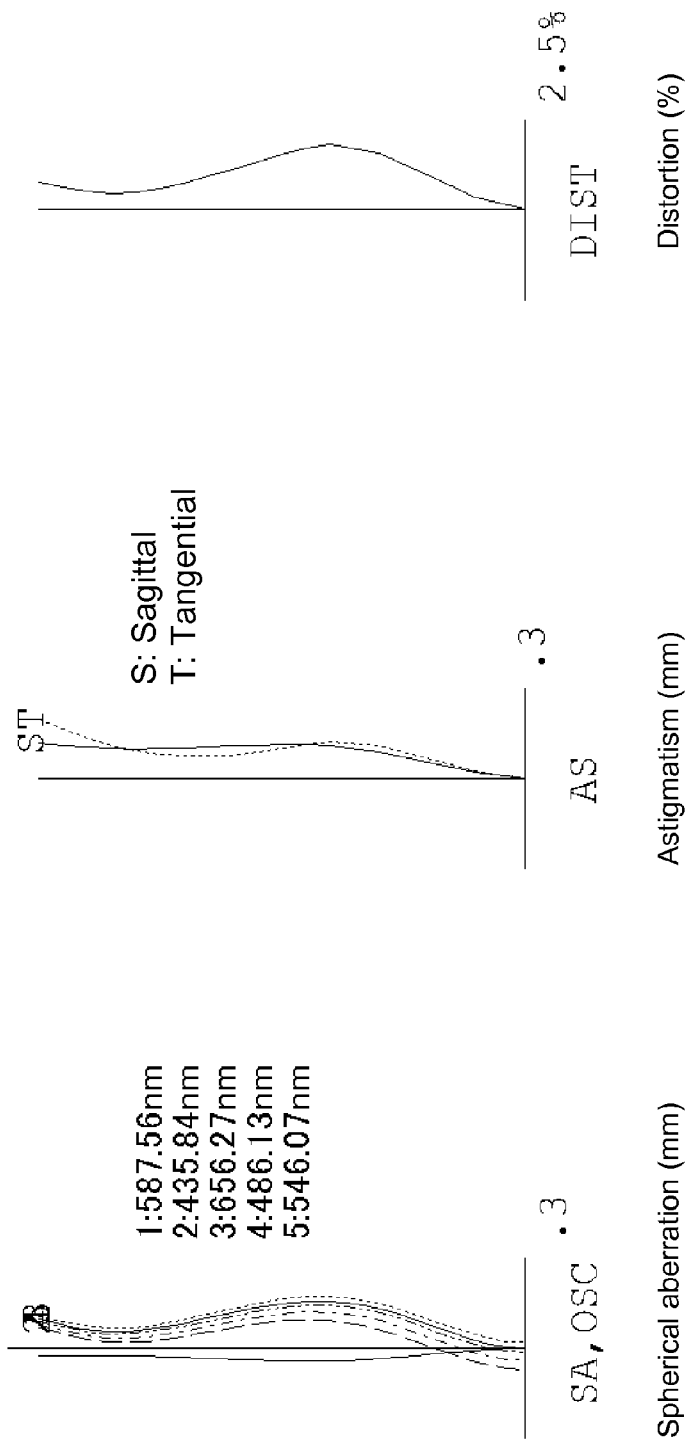
FIG. 15 is an aberration diagram showing a spherical aberration, an astigmatism, and a distortion of the imaging lens of FIG. 13.

FIG. 14 shows the lateral aberration that corresponds to the half angle of view ω in the imaging lens of Numerical Data Example 5. Furthermore, FIG. 15 shows the spherical aberration SA (mm), the astigmatism AS (mm), and the distortion DIST (%) of the imaging lens, respectively. As shown in FIGS. 14 and 15, in the imaging lens of Numerical Data Example 5, the image surface is also satisfactorily corrected and the respective aberrations are suitably corrected, similarly to Numerical Data Example 1.

The imaging lens of Numerical Data Example 5 satisfies the conditional expressions (7) and (7A) similarly to Numerical Data Example 1. In Numerical Data Example 5, the aperture diameter D is 1.58 mm and f/D=2.286, and therefore the imaging lens of Numerical Data Example 5 also satisfies the conditional expressions (7) and (7A).

(Second Embodiment)

Hereunder, referring to the accompanying drawings, a second embodiment of the invention will be fully described.

Figure 16:
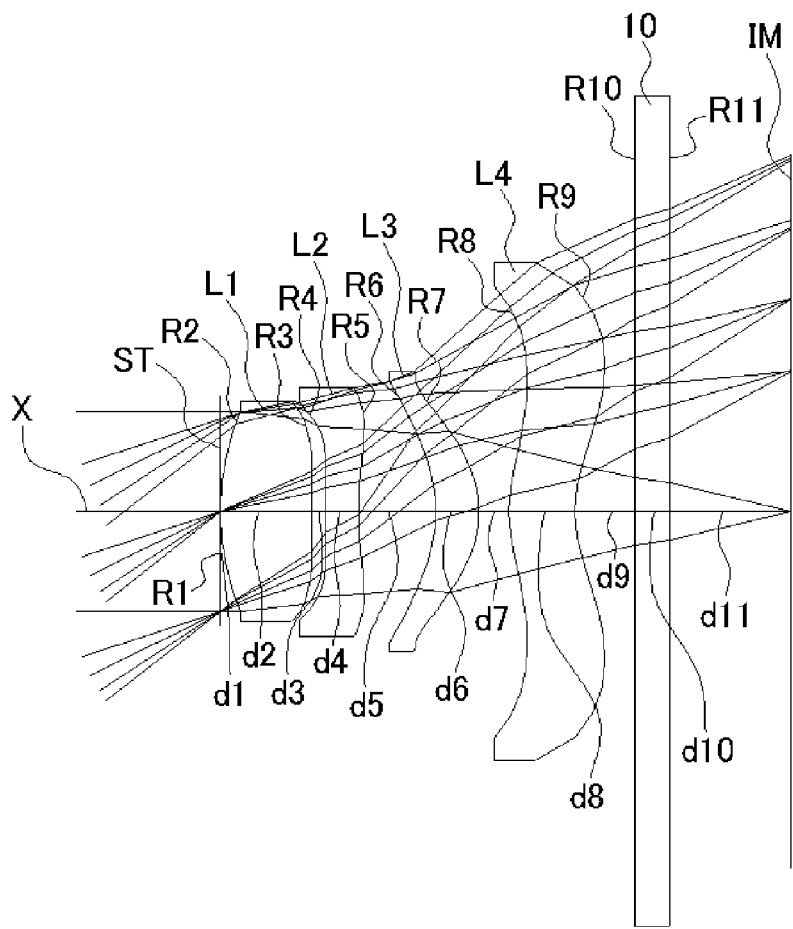
FIG. 16 is a schematic sectional view showing a configuration of an imaging lens in Numerical Data Example 6 according to a second embodiment.

FIG. 16 is a sectional view of the lens in Numerical Data Example 6 according to the embodiment.

As shown in FIG. 16, an imaging lens of this embodiment includes an aperture stop ST; a first lens L1 having positive refractive power; a second lens L2 having negative refractive power; a third lens L3 having positive refractive power; and a fourth lens L4 having positive refractive power arranged in this order from an object side to an image side. Therefore, the imaging lens of this embodiment is also configured as an imaging lens having the aperture stop on the front side, i.e. having the aperture stop ST on the object side of the first lens L1. Here, the filter 10 is arranged between the fourth lens L4 and the image plane IM. As described above, in the imaging lens of this embodiment, the fourth lens L4 has positive refractive power and the refractive power arrangement is different from that of the imaging lens of the first embodiment.

The shape of each lens of the imaging lens of the embodiment is similar to that of each lens in the imaging lens of the first embodiment. More specifically, the first lens L1, the second lens L2, and the fourth lens L4 are shaped to form meniscus lenses directing their convex surfaces to the object side near the optical axis X, and the third lens L3 is shaped to form a meniscus lens directing the concave surface to the object side near the optical axis X.

The imaging lens of this embodiment also satisfies the following conditional expressions (1) to (6), similarly to the imaging lens of the first embodiment. Therefore, the imaging lens of this embodiment also attains both miniaturization and good aberration correction of the imaging lens.

$0.3 < |f1/f2| < 0.7$    (1)

$1.5 < f12/f < 2.5$    (2)

$1.5 < f23/f < 9.0$    (3)

$0.2 < f12/f23 < 1.0$    (4)

$0.05 < R1f/R1r < 0.25$ (5)

$0.1 < R2f/R1r < 0.7$ (6)

In the above conditional expressions,
    f: Focal length of the whole lens system
    f1: Focal length of the first lens L1
    f2: Focal length of the second lens L2
    f12: Composite focal length of the first lens L1 and the second lens L2
    f23: Composite focal length of the second lens L2 and the third lens L3
    R1f: Curvature radius of a surface of the first lens L1 on the object side
    R1r: Curvature radius of a surface of the first lens L1 on the image side
    R2f: Curvature radius of a surface of the second lens on the object side The imaging lens of this embodiment satisfies the following conditional expression (3A) to reduce the size of the imaging lens while further satisfactorily correcting the field curvature:

$1.5 < f23/f < 6.5$ (3A)

Here, it is not necessary to satisfy all of the conditional expressions (1) to (6). When any single one of the conditional expressions (1) to (6) is individually satisfied, it is possible to obtain an effect corresponding to the respective conditional expression.

In the imaging lens of this embodiment, the second lens L2 has Abbe's number lower than those of the first lens L1, the third lens L3, and the fourth lens L4 and within the following range so as to restrain the axial chromatic aberration and the off-axis chromatic aberration within satisfactory range.

Abbe's number of the first lens L1 for a d line vd1: vd1>50
    Abbe's number of the second lens L2 for a d line vd2: vd2<35
    Abbe's number of the third lens L3 for a d line vd3: vd3>50
    Abbe's number of the fourth lens L4 for a d line vd4: vd4>50

Next, Numerical Data Example 6 of the embodiment will be described. In Numerical Data Example 6, f represents a focal length of a whole lens system, Fno represents an F number, and ω represents a half angle of view, respectively. In addition, i represents a surface number counted from the object side, R represents a curvature radius, d represents a distance between lens surfaces (surface spacing) on the optical axis, Nd represents a refractive index for a d line, and vd represents Abbe's number for the d line, respectively. Here, aspheric surfaces are indicated with surface numbers i affixed with * (asterisk).

NUMERICAL DATA EXAMPLE 6

Basic lens data are shown below.

f = 3.624 mm, Fno = 2.157, ω = 39.48°
Unit: mm

Surface Data

| Surface Number i | R | d | Nd | vd |
|---|---|---|---|---|
| (Object) | ∞ | ∞ | | |
| 1 (Stop) | ∞ | 0.0000 | | |
| 2* | 2.088 (=R1f) | 0.7700 | 1.52470 | 56.2 (=vd1) |
| 3* | 24.735 (=R1r) | 0.1150 | | |
| 4* | 7.492 (=R2f) | 0.2800 | 1.61420 | 26.0 (=vd2) |
| 5* | 3.350 | 0.6500 | | |
| 6* | −1.195 | 0.3600 | 1.54340 | 56.0 (=vd3) |
| 7* | −1.031 | 0.2500 | | |
| 8* | 1.124 | 0.5600 | 1.52470 | 56.2 (=vd4) |
| 9* | 0.942 | 0.5000 | | |
| 10 | ∞ | 0.3000 | 1.51633 | 64.1 |
| 11 | ∞ | 1.0217 | | |
| (Image plane) | ∞ | | | | f1 = 4.296 mm
f2 = −10.126 mm
f12 = 6.386 mm
f23 = 20.820 mm

Aspheric Surface Data

Second Surface k = 5.268068E−01, $A_4$ = 1.962662E−02, $A_6$ = −1.203564E−01, $A_8$ = 2.038267E−01, $A_{10}$ = −1.634680E−01

Third Surface k = 0.000000, $A_4$ = −7.715397E−02, $A_6$ = −4.575447E−01, $A_8$ = 5.105667E−01, $A_{10}$ = −2.446580E−01

Fourth Surface k = 0.000000, $A_4$ = −1.298323E−01, $A_6$ = −8.194405E−01, $A_8$ = 8.256134E−01, $A_{10}$ = −2.583833E−01

Fifth Surface k = 7.347353, $A_4$ = −5.543249E−03, $A_6$ = −5.892791E−01, $A_8$ = 8.334172E−01, $A_{10}$ = −6.206920E−01, $A_{12}$ = 1.716501E−01

Sixth Surface k = −1.831302, $A_4$ = 9.883826E−02, $A_6$ = −9.617348E−02, $A_8$ = −9.233483E−03, $A_{10}$ = 4.983944E−02, $A_{12}$ = 1.433880E−01, $A_{14}$ = −2.413320E−01, $A_{16}$ = 9.355704E−02

Seventh Surface k = −4.775867E−01, $A_4$ = −2.335358E−01, $A_6$ = 8.144476E−01, $A_8$ = −1.124710, $A_{10}$ = 8.024938E−01, $A_{12}$ = −1.164540E−01, $A_{14}$ = −9.578033E−02, $A_{16}$ = 3.042560E−02

Eighth Surface k = −1.007348E+01, $A_4$ = −1.283652E−01, $A_6$ = 9.197427E−02, $A_8$ = −5.632697E−02, $A_{10}$ = 2.170959E−02, $A_{12}$ = −4.677104E−03, $A_{14}$ = 4.145128E−04

Ninth Surface k = −5.418946, $A_4$ = −1.303724E−01, $A_6$ = 7.997797E−02, $A_8$ = −4.336188E−02, $A_{10}$ = 1.546675E−02, $A_{12}$ = −3.526559E−03, $A_{14}$ = 4.627133E−04, $A_{16}$ = −2.743192E−05

The values of the respective conditional expressions are as follows:

|f1/f2|=0.424 f12/f=1.762 f23/f=5.745 f12/f23=0.307

R1f/R1r=0.084

R2f/R1r=0.303

Accordingly, the imaging lens of Numerical Data Example 6 satisfies the conditional expressions (1) to (6). An on-axis distance (a length in air) from the surface of the aperture stop ST to the image plane IM is 4.705 mm, and therefore the size of the imaging lens is reduced. Moreover, the half angle of view ω in the imaging lens is 39.48° and therefore the imaging lens of the invention has a wider angle of view than that of conventional imaging lens.

Figure 17:
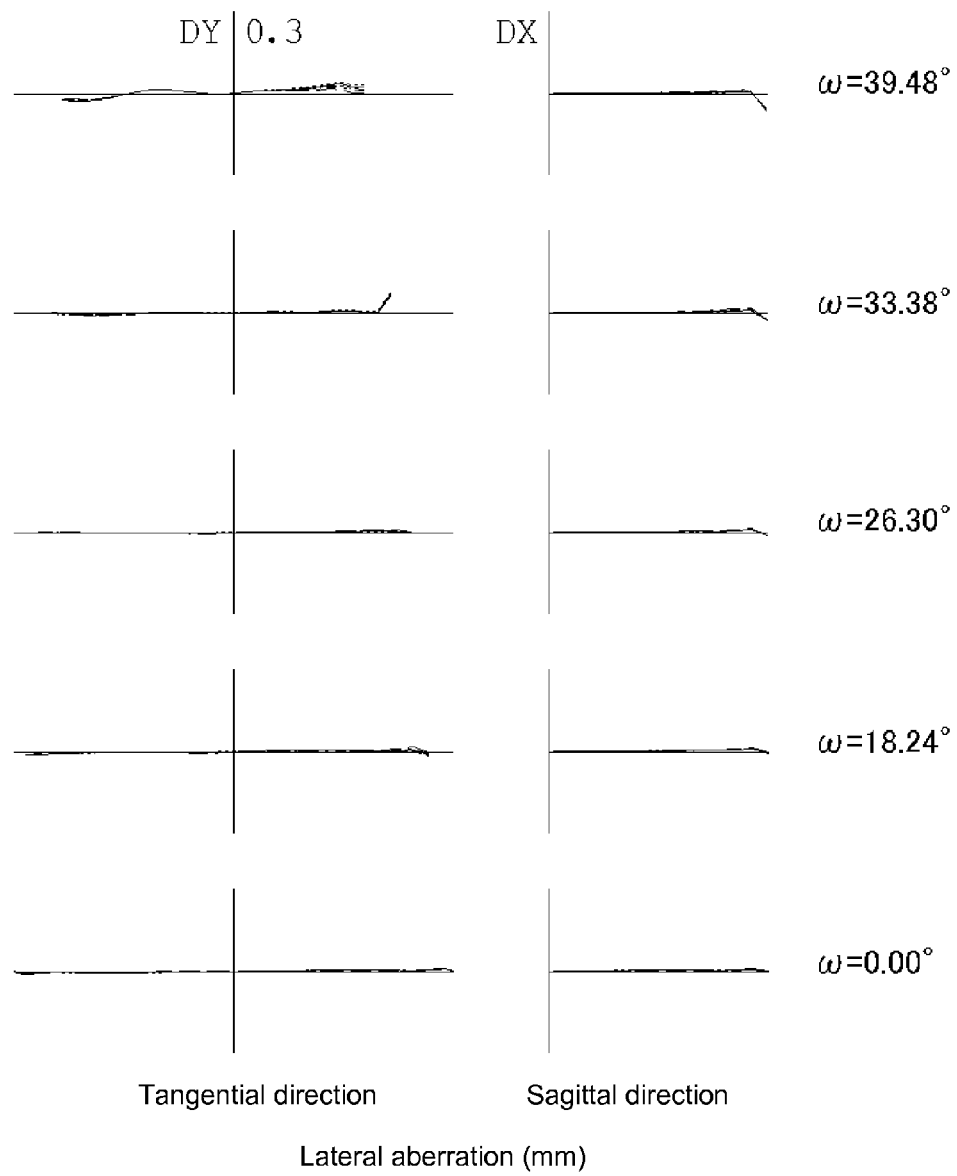
FIG. 17 is an aberration diagram showing a lateral aberration of the imaging lens of FIG. 16.
Figure 18:
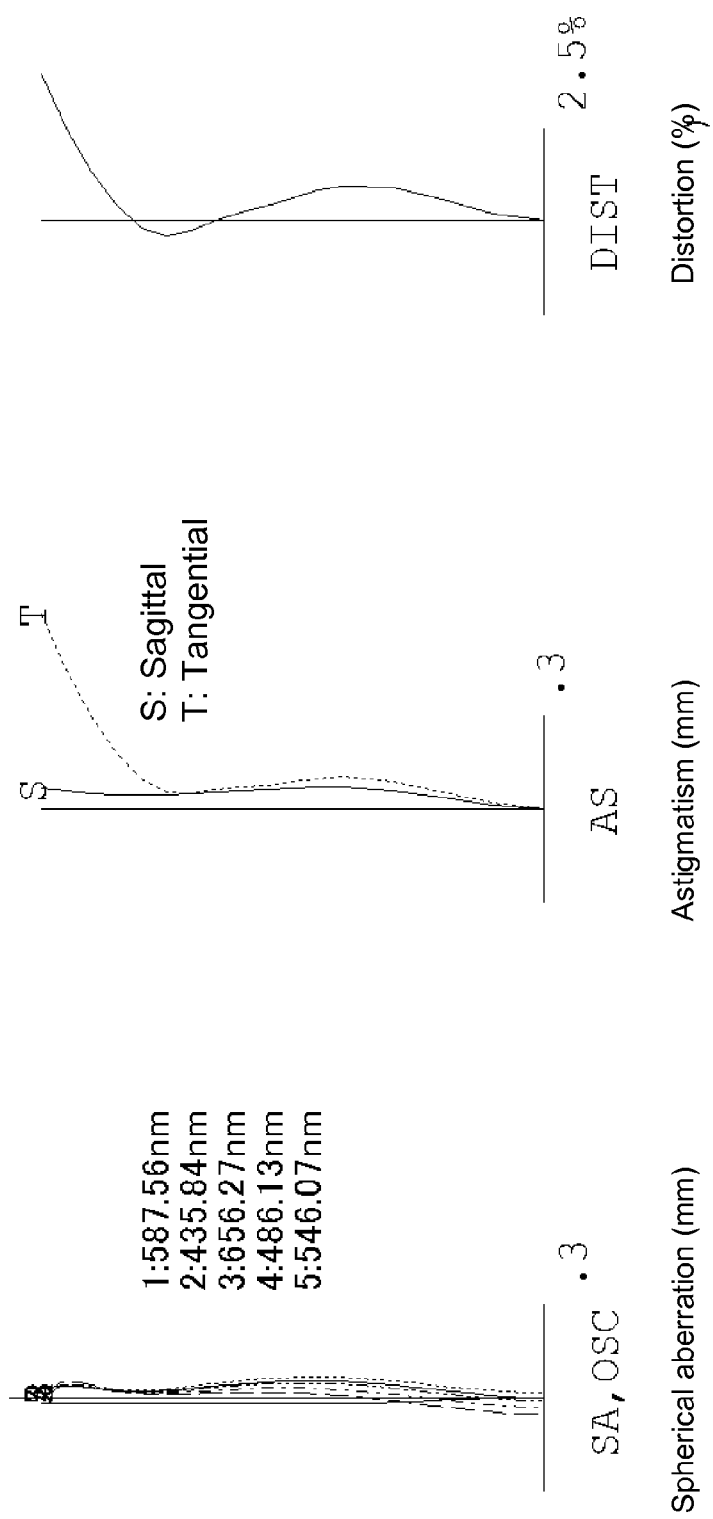
FIG. 18 is an aberration diagram showing a spherical aberration, an astigmatism, and a distortion of the imaging lens of FIG. 16.

FIG. 17 shows the lateral aberration that corresponds to the half angle of view ω in the imaging lens of Numerical Data Example 6. Furthermore, FIG. 18 shows the spherical aberration SA (mm), the astigmatism AS (mm), and the distortion DIST (%) of the imaging lens, respectively. As shown in FIGS. 17 and 18, in the imaging lens of Numerical Data Example 6, the image surface is also satisfactorily corrected and the respective aberrations are suitably corrected.

When the aperture diameter of the aperture stop ST is D, the imaging lens of Numerical Data Example 6 satisfies the following conditional expressions (7) and (7A):

$$1.5 < f/D < 2.8 \tag{7}$$

$$1.8 < f/D < 2.6 \tag{7A}$$

In Numerical Data Example 6, the aperture diameter D is 1.68 mm and f/D=2.157, and therefore the imaging lens of Numerical Data Example 6 satisfies the conditional expressions (7) and (7A).

Accordingly, when the imaging lens of the respective embodiments is applied to an imaging optical system of a cellular phone, a digital still camera, a portable information terminal, a security camera, a vehicle onboard camera, a network camera, and the like, it is possible to achieve both the high performance and the small size for the camera or the like.

The invention may be applicable to the imaging lens of a device that is required to have a small size and satisfactory aberration correction ability with wide angle of view., e.g., the imaging lenses used in the cellular phones, the digital still cameras, and the like.

What is claimed is:

1. An imaging lens comprising:
a first lens having positive refractive power;
a second lens having negative refractive power;
a third lens having positive refractive power; and
a fourth lens arranged in this order from an object side to an image side,
wherein said first lens is formed so that both a curvature radius of a surface thereof on the object side and a curvature radius of a surface thereof on the image side are positive;
said second lens is formed in a shape so that both a curvature radius of a surface thereof on the object side and a curvature radius of a surface thereof on the image side are positive;
said third lens is formed in a shape so that both a curvature radius of a surface thereof on the object side and a curvature radius of a surface thereof on the image side are negative;
said fourth lens is formed in a shape so that both a curvature radius of a surface thereof on the object side and a curvature radius of a surface thereof on the image side are positive;
when the first lens has a focal length of f1 and the second lens has a focal length f2, the imaging lens is configured to satisfy the following conditional expression:

$$0.3 < |f1/f2| < 0.7, \text{ and}$$

when the whole lens system has a focal length f and composite focal length of the second lens and the third lens is f23, the imaging lens is configured to satisfy the following conditional expression:

$$1.5 < f23/f < 9.0.$$

2. The imaging lens according to claim 1, wherein the whole lens system has the focal length f and a composite focal length of the first lens and the second lens is f12 so that the imaging lens is configured to satisfy the following conditional expression:

$$1.5 < f12/f < 2.5.$$

3. The imaging lens according to claim 1, wherein a composite focal length of the first lens and the second lens is f12 and the composite focal length of the second lens and the third lens is f23 so that the imaging lens is configured to satisfy the following conditional expression:

$$0.2 < f12/f \leq 1.0.$$

4. The imaging lens according to claim 1, wherein the surface of the first lens on the object side has a curvature radius R1f and the surface of the first lens on the image side has a curvature radius R1r so that the imaging lens is configured to satisfy the following conditional expression:

$$0.05 < R1f/R1r < 0.25.$$

5. The imaging lens according to claim 1, wherein the surface of the first lens on the image side has a curvature radius R1r and a surface of the second lens on the object side has a curvature radius R2f so that the imaging lens is configured to satisfy the following conditional expression:

$$0.1 < R2f/R1r < 0.7.$$

6. The imaging lens according to claim 1, further comprising an aperture stop arranged on the object side of the first lens, said aperture stop having an aperture diameter D and the whole lens system has the focal length f so that the imaging lens is configured to satisfy the following conditional expression:

$$1.5 < f/D < 2.8.$$

7. An imaging lens comprising:
a first lens having positive refractive power;
a second lens having negative refractive power;
a third lens having positive refractive power; and
a fourth lens arranged in this order from an object side to an image side,
wherein said first lens is formed so that both a curvature radius of a surface thereof on the object side and a curvature radius of a surface thereof on the image side are positive;
said second lens is formed in a shape so that both a curvature radius of a surface thereof on the object side and a curvature radius of a surface thereof on the image side are positive;
said third lens is formed in a shape so that both a curvature radius of a surface thereof on the object side and a curvature radius of a surface thereof on the image side are negative;
said fourth lens is formed in a shape so that both a curvature radius of a surface thereof on the object side and a curvature radius of a surface thereof on the image side are positive;
when the first lens has a focal length of f1 and the second lens has a focal length f2, the imaging lens is configured to satisfy the following conditional expression:

$$0.3 < |f1/f2| < 0.7, \text{ and}$$

when a domposite focal length of the first lens and the second lens is f12 and a composite focal length of the second lens and the third lens is f23, the imaging lens is configured to satisfy the following conditional expression:

$$0.2 < f12/f23 < 1.0.$$

8. The imaging lens according to claim 7, wherein the whole lens system has a focal length f and a composite focal length of the first lens and the second lens is f12 so that the imaging lens is configured to satisfy the following conditional expression:

$1.5 < f12/f < 2.5$.

9. The imaging lens according to claim 7, wherein the whole lens system has a focal length f and a composite focal length of the second lens and the third lens is f23 so that the imaging lens is configured to satisfy the following conditional expression:

$1.5 < f23/f < 9.0$.

10. The imaging lens according to claim 7, wherein the surface of the first lens on the object side has a curvature radius R1f and the surface of the first lens on the image side has a curvature radius R1r so that the imaging lens is configured to satisfy the following conditional expression:

$0.05 < R1f/R1r < 0.25$.

11. The imaging lens according to claim 7, wherein the surface of the first lens on the image side has a curvature radius R1r and a surface of the second lens on the object side has a curvature radius R2f so that the imaging lens is configured to satisfy the following conditional expression:

$0.1 < R2f/R1r < 0.7$.

12. The imaging lens according to claim 7, further comprising an aperture stop arranged on the object side of the first lens, said aperture stop having an aperture diameter D and the whole lens system has a focal length f so that the imaging lens is configured to satisfy the following conditional expression:

$1.5 < f/D < 2.8$.

13. An imaging lens comprising:
a first lens having positive refractive power;
a second lens having negative refractive power;
a third lens having positive refractive power;
a fourth lens arranged in this order from an object side to an image side; and
an aperture stop arranged on the object side of the first lens;
wherein said first lens is formed so that both a curvature radius of a surface thereof on the object side and a curvature radius of a surface thereof on the image side are positive;
said second lens is formed in a shape so that both a curvature radius of a surface thereof on the object side and a curvature radius of a surface thereof on the image side are positive;
said third lens is formed in a shape so that both a curvature radius of a surface thereof on the object side and a curvature radius of a surface thereof on the image side are negative;
said fourth lens is formed in a shape so that both a curvature radius of a surface thereof on the object side and a curvature radius of a surface thereof on the image side are positive;
when the first lens has a focal length of f1 and the second lens has a focal length f2, the imaging lens is configured to satisfy the following conditional expression:

$0.3 < |f1/f2| < 0.7$, and said aperture stop has an aperture diameter D and the whole lens system has a focal length f so that the imaging lens is configured to satisfy the following conditional expression:

$1.5 < f/D < 2.8$.

14. The imaging lens according to claim 13, wherein the whole lens system has a focal length f and a composite focal length of the first lens and the second lens is f12 so that the imaging lens is configured to satisfy the following conditional expression:

$1.5 < f12/f < 2.5$.

15. The imaging lens according to claim 13, wherein the whole lens system has the focal length f and a composite focal length of the second lens and the third lens is f23 so that the imaging lens is configured to satisfy the following conditional expression:

$1.5 < f23/f < 9.0$.

16. The imaging lens according to claim 13, wherein a composite focal length of the first lens and the second lens is f12 and a composite focal length of the second lens and the third lens is f23 so that the imaging lens is configured to satisfy the following conditional expression:

$0.2 < f12/f23 < 1.0$.

17. The imaging lens according to claim 13, wherein the surface of the first lens on the object side has a curvature radius R1f and the surface of the first lens on the image side has a curvature radius R1r so that the imaging lens is configured to satisfy the following conditional expression:

$0.05 < R1f/R1r < 0.25$.

18. The imaging lens according to claim 13, wherein the surface of the first lens on the image side has a curvature radius R1r and a surface of the second lens on the object side has a curvature radius R2f so that the imaging lens is configured to satisfy the following conditional expression:

$0.1 < R2f/R1r < 0.7$.

* * * * *

UNITED STATES PATENT AND TRADEMARK OFFICE
CERTIFICATE OF CORRECTION

PATENT NO.       : 8,508,648 B2
APPLICATION NO.  : 13/206136
DATED            : August 13, 2013
INVENTOR(S)      : Yoji Kubota et al.

Page 1 of 1

It is certified that error appears in the above-identified patent and that said Letters Patent is hereby corrected as shown below:

In the Claims

Column 20, Approximately line 14,

Error:        claim 3        $0.2 < f12/f \leqq 1.0$

Correction:   claim 3        $0.2 < f12/f23 < 1.0$

Signed and Sealed this
Twenty-first Day of April, 2015

Michelle K. Lee
*Director of the United States Patent and Trademark Office*